(12) United States Patent
Trudel et al.

(10) Patent No.: US 12,373,452 B2
(45) Date of Patent: Jul. 29, 2025

(54) IDENTITY RESOLUTION IN BIG, NOISY, AND/OR UNSTRUCTURED DATA

(71) Applicant: www.TrustScience.com Inc., Edmonton (CA)

(72) Inventors: Chris Trudel, Edmonton (CA); Zhaochen Guo, Edmonton (CA); Leo M. Chan, Edmonton (CA); Daniel Chi Yin Chui, Edmonton (CA); Ashif Mawji, Edmonton (CA)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 0 days.

(21) Appl. No.: 16/745,498

(22) Filed: Jan. 17, 2020

(65) Prior Publication Data
US 2020/0272645 A1 Aug. 27, 2020

Related U.S. Application Data

(63) Continuation of application No. 16/204,651, filed on Nov. 29, 2018, now abandoned, which is a (Continued)

(51) Int. Cl.
*G06F 16/215* (2019.01)
*G06F 7/14* (2006.01)
(Continued)

(52) U.S. Cl.
CPC ............ *G06F 16/2465* (2019.01); *G06F 7/14* (2013.01); *G06F 16/23* (2019.01);
(Continued)

(58) Field of Classification Search
CPC .... G06F 16/2465; G06F 16/285; G06F 16/23; G06F 16/2456; G06F 16/288; G06F 16/2365; G06F 7/14
See application file for complete search history.

(56) References Cited

U.S. PATENT DOCUMENTS

| | | | |
|---|---|---|---|
| 5,555,542 A | 9/1996 | Ogura et al. | |
| 5,832,494 A | 11/1998 | Egger et al. | |

(Continued)

FOREIGN PATENT DOCUMENTS

| | | | |
|---|---|---|---|
| CA | 2600344 A1 | 9/2006 | |
| CA | 2775899 A1 | 4/2011 | |

(Continued)

OTHER PUBLICATIONS

Final Office Action received for U.S. Appl. No. 15/644,356 dated Apr. 30, 2020, 56 pages.
(Continued)

*Primary Examiner* — Tarek Chbouki
(74) *Attorney, Agent, or Firm* — Amin, Turocy & Watson, LLP

(57) ABSTRACT

In an environment containing big data, noisy data, and/or unstructured data, it is desirable to identify an entity referenced by input data. The entity can be identified by generating records corresponding to characteristics of the entity based on the input data. These records can be merged when it is determined that more than one record corresponds to the same entity. By doing so it is possible to more easily identify and classify information related to an entity, though such information may have been obtained in a manner that might otherwise be deemed unstructured or noisy. The method can be applied across large sets of data ("big data") to obtain meaning from data that may otherwise be unclassifiable to a human observer.

19 Claims, 15 Drawing Sheets

Related U.S. Application Data continuation of application No. 15/466,590, filed on Mar. 22, 2017, now Pat. No. 10,180,969.

(51) Int. Cl.
  *G06F 16/23* (2019.01)
  *G06F 16/2455* (2019.01)
  *G06F 16/2458* (2019.01)
  *G06F 16/28* (2019.01)

(52) U.S. Cl.
  CPC ...... *G06F 16/2365* (2019.01); *G06F 16/2456* (2019.01); *G06F 16/285* (2019.01); *G06F 16/288* (2019.01)

(56) References Cited

U.S. PATENT DOCUMENTS

| | | | |
|---|---|---|---|
| 5,860,605 A | 1/1999 | Van Der Zanden | |
| 6,108,308 A | 8/2000 | Flavin et al. | |
| 6,233,571 B1 | 5/2001 | Egger et al. | |
| 6,286,007 B1 | 9/2001 | Miller et al. | |
| 6,356,902 B1 | 3/2002 | Tan et al. | |
| 6,446,048 B1 | 9/2002 | Wells et al. | |
| 6,509,898 B2 | 1/2003 | Chi et al. | |
| 6,633,886 B1 | 10/2003 | Chong | |
| 6,708,308 B2 | 3/2004 | De Souza et al. | |
| 6,738,777 B2 | 5/2004 | Bliss et al. | |
| 6,751,729 B1 | 6/2004 | Giniger et al. | |
| 6,823,299 B1 | 11/2004 | Contreras | |
| 7,010,471 B2 | 3/2006 | Rosenberg | |
| 7,069,259 B2 | 6/2006 | Horvitz et al. | |
| 7,086,085 B1 | 8/2006 | Brown et al. | |
| 7,130,262 B1 | 10/2006 | Cortez et al. | |
| 7,130,908 B1 | 10/2006 | Pecus et al. | |
| 7,139,837 B1 | 11/2006 | Parekh et al. | |
| 7,266,649 B2 | 9/2007 | Yoshida et al. | |
| 7,272,719 B2 | 9/2007 | Bleckmann et al. | |
| 7,451,365 B2 | 11/2008 | Wang et al. | |
| 7,458,049 B1 | 11/2008 | Tuncer et al. | |
| 7,512,612 B1 | 3/2009 | Akella et al. | |
| 7,539,697 B1 | 5/2009 | Akella et al. | |
| 7,664,802 B2 | 2/2010 | Aaltonen et al. | |
| 7,668,665 B2 | 2/2010 | Kim | |
| 7,685,192 B1 | 3/2010 | Scofield et al. | |
| 7,743,208 B2 | 6/2010 | Yoshida et al. | |
| 7,801,971 B1 | 9/2010 | Amidon et al. | |
| 7,805,407 B1 | 9/2010 | Verbeke et al. | |
| 7,822,631 B1 | 10/2010 | Vander Mey et al. | |
| 7,856,449 B1 | 12/2010 | Martino et al. | |
| 7,865,551 B2 | 1/2011 | Mcculler | |
| 7,886,334 B1 | 2/2011 | Walsh | |
| 7,899,757 B1 | 3/2011 | Talan et al. | |
| 7,930,255 B2 | 4/2011 | Choi et al. | |
| 8,010,458 B2 | 8/2011 | Galbreath et al. | |
| 8,010,460 B2 | 8/2011 | Work et al. | |
| 8,010,602 B2 | 8/2011 | Shen et al. | |
| 8,107,397 B1 | 1/2012 | Bagchi et al. | |
| 8,108,536 B1 | 1/2012 | Hernacki et al. | |
| 8,156,558 B2 | 4/2012 | Goldfeder et al. | |
| 8,170,958 B1 | 5/2012 | Gremett et al. | |
| 8,180,804 B1 | 5/2012 | Narayanan et al. | |
| 8,214,883 B2 | 7/2012 | Obasanjo et al. | |
| 8,234,688 B2 | 7/2012 | Grandison et al. | |
| 8,237,714 B1 | 8/2012 | Burke | |
| 8,244,848 B1 | 8/2012 | Narayanan | |
| 8,261,078 B2 | 9/2012 | Barriga et al. | |
| 8,275,866 B2 | 9/2012 | Klincewicz | |
| 8,301,617 B2 | 10/2012 | Muntz et al. | |
| 8,306,973 B2 | 11/2012 | Ohazama et al. | |
| 8,316,056 B2 | 11/2012 | Wable | |
| 8,386,301 B2 | 2/2013 | Rajasingham | |
| 8,392,590 B2 | 3/2013 | Bouchard et al. | |
| 8,443,366 B1 | 5/2013 | Yancey | |
| 8,468,103 B2 | 6/2013 | Galbreath et al. | |
| 8,489,641 B1 | 7/2013 | Seefeld et al. | |
| 8,516,196 B2 | 8/2013 | Jain et al. | |
| 8,560,605 B1 | 10/2013 | Gyongyi | |
| 8,572,129 B1 | 10/2013 | Lee et al. | |
| 8,601,025 B1 | 12/2013 | Shajenko et al. | |
| 8,606,721 B1 | 12/2013 | Dicker | |
| 8,621,215 B1 | 12/2013 | Iyer | |
| 8,682,837 B2 | 3/2014 | Skelton | |
| 8,683,423 B2 | 3/2014 | Amaral et al. | |
| 8,688,701 B2 | 4/2014 | Ghosh et al. | |
| 8,725,673 B2 | 5/2014 | Kast et al. | |
| 8,768,759 B2 | 7/2014 | Ghosh et al. | |
| 8,832,093 B2 | 9/2014 | Redstone et al. | |
| 8,832,790 B1 | 9/2014 | Villa et al. | |
| 8,874,572 B1 | 10/2014 | Broyles | |
| 8,949,250 B1 | 2/2015 | Garg et al. | |
| 9,143,503 B2 | 9/2015 | Lo et al. | |
| 9,147,273 B1 | 9/2015 | Allen et al. | |
| 9,154,491 B1 | 10/2015 | Leske | |
| 9,171,336 B2 | 10/2015 | Englar et al. | |
| 9,171,338 B2 | 10/2015 | Chrapko et al. | |
| 9,223,978 B2 | 12/2015 | Kraemer | |
| 9,319,419 B2 | 4/2016 | Sprague et al. | |
| 9,390,243 B2 | 7/2016 | Dhillon et al. | |
| 9,438,619 B1 | 9/2016 | Chan et al. | |
| 9,443,004 B2 | 9/2016 | Chan | |
| 9,443,044 B2 | 9/2016 | Gou et al. | |
| 9,460,475 B2 | 10/2016 | Chrapko et al. | |
| 9,584,540 B1 | 2/2017 | Chan et al. | |
| 9,613,341 B2 | 4/2017 | Shivakumar | |
| 9,721,296 B1 | 8/2017 | Chrapko | |
| 9,747,650 B2 | 8/2017 | Chrapko et al. | |
| 9,785,696 B1 * | 10/2017 | Yakhnenko | G06F 16/30 |
| 9,846,896 B2 * | 12/2017 | Shah | G06Q 30/0282 |
| 10,007,895 B2 * | 6/2018 | Vanasco | G06F 16/9024 |
| 10,402,457 B1 | 9/2019 | Lawrence | |
| 10,585,893 B2 * | 3/2020 | Dantressangle | G06F 16/22 |
| 10,673,880 B1 * | 6/2020 | Pratt | H04L 63/1433 |
| 10,732,810 B1 * | 8/2020 | Cohen | G06F 16/235 |
| 11,086,905 B1 * | 8/2021 | Schuck | G06Q 10/10 |
| 11,106,692 B1 * | 8/2021 | Guetta | G06F 16/248 |
| 11,443,390 B1 * | 9/2022 | Caligaris | G06Q 40/125 |
| 2003/0046280 A1 | 3/2003 | Rotter et al. | |
| 2003/0076825 A1 | 4/2003 | Guruprasad | |
| 2003/0133411 A1 | 7/2003 | Ise et al. | |
| 2003/0227924 A1 | 12/2003 | Kodialam et al. | |
| 2004/0018518 A1 | 1/2004 | Krieb et al. | |
| 2004/0088147 A1 | 5/2004 | Wang et al. | |
| 2004/0122803 A1 | 6/2004 | Dom et al. | |
| 2004/0181461 A1 | 9/2004 | Raiyani et al. | |
| 2004/0181518 A1 | 9/2004 | Mayo et al. | |
| 2004/0239674 A1 | 12/2004 | Ewald | |
| 2005/0021622 A1 | 1/2005 | Cullen | |
| 2005/0083936 A1 | 4/2005 | Ma | |
| 2005/0096987 A1 | 5/2005 | Miyauchi | |
| 2005/0149522 A1 * | 7/2005 | Cookson, Jr. | G06F 16/211 |
| 2005/0243736 A1 | 11/2005 | Faloutsos et al. | |
| 2005/0256949 A1 | 11/2005 | Gruhl et al. | |
| 2005/0286414 A1 | 12/2005 | Young et al. | |
| 2006/0136419 A1 | 6/2006 | Brydon et al. | |
| 2006/0212931 A1 | 9/2006 | Shull et al. | |
| 2006/0248026 A1 | 11/2006 | Aoyama et al. | |
| 2006/0248573 A1 | 11/2006 | Pannu et al. | |
| 2006/0259957 A1 | 11/2006 | Tam et al. | |
| 2006/0271564 A1 | 11/2006 | Meng Muntz et al. | |
| 2006/0282546 A1 | 12/2006 | Reynolds et al. | |
| 2006/0287842 A1 | 12/2006 | Kim | |
| 2006/0290697 A1 | 12/2006 | Madden et al. | |
| 2006/0294134 A1 | 12/2006 | Berkhim et al. | |
| 2007/0087819 A1 | 4/2007 | Van Luchene et al. | |
| 2007/0109302 A1 | 5/2007 | Tsuboshita et al. | |
| 2007/0124291 A1 | 5/2007 | Hassan et al. | |
| 2007/0136086 A1 | 6/2007 | Luerssen | |
| 2007/0143629 A1 | 6/2007 | Hardjono et al. | |
| 2007/0162761 A1 | 7/2007 | Davis et al. | |
| 2007/0180495 A1 | 8/2007 | Hardjono et al. | |
| 2007/0214249 A1 | 9/2007 | Ahmed et al. | |
| 2007/0214259 A1 | 9/2007 | Ahmed et al. | |
| 2007/0220146 A1 | 9/2007 | Suzuki | |
| 2007/0263012 A1 | 11/2007 | Panditharadhya et al. | |

(56) References Cited

U.S. PATENT DOCUMENTS

| | | |
|---|---|---|
| 2007/0282886 A1 | 12/2007 | Purang et al. |
| 2008/0005096 A1 | 1/2008 | Moore |
| 2008/0015916 A1 | 1/2008 | Cossey et al. |
| 2008/0059576 A1 | 3/2008 | Liu et al. |
| 2008/0086442 A1 | 4/2008 | Dasdan et al. |
| 2008/0101343 A1 | 5/2008 | Monette et al. |
| 2008/0104225 A1 | 5/2008 | Zhang et al. |
| 2008/0109451 A1 | 5/2008 | Harding |
| 2008/0133391 A1 | 6/2008 | Kurian et al. |
| 2008/0133552 A1 | 6/2008 | Leary |
| 2008/0155070 A1 | 6/2008 | El-Damhougy et al. |
| 2008/0183378 A1 | 7/2008 | Weidner |
| 2008/0281694 A1* | 11/2008 | Kretz .............. G06Q 30/0267 705/14.64 |
| 2008/0288457 A1 | 11/2008 | Aaltonen et al. |
| 2008/0288612 A1 | 11/2008 | Kwon |
| 2008/0313119 A1 | 12/2008 | Leskovec et al. |
| 2009/0024629 A1 | 1/2009 | Miyauchi |
| 2009/0027392 A1 | 1/2009 | Jadhav et al. |
| 2009/0043489 A1 | 2/2009 | Weidner |
| 2009/0049517 A1* | 2/2009 | Sorniotti .............. H04L 9/0844 726/1 |
| 2009/0063157 A1 | 3/2009 | Seo |
| 2009/0064293 A1 | 3/2009 | Li et al. |
| 2009/0094134 A1 | 4/2009 | Toomer |
| 2009/0106822 A1 | 4/2009 | Obasanjo et al. |
| 2009/0198562 A1 | 8/2009 | Wiesinger et al. |
| 2009/0276233 A1 | 11/2009 | Brimhall et al. |
| 2009/0296568 A1 | 12/2009 | Kitada |
| 2009/0327054 A1 | 12/2009 | Yao |
| 2010/0004940 A1 | 1/2010 | Choi et al. |
| 2010/0010826 A1 | 1/2010 | Rosenthal et al. |
| 2010/0043055 A1 | 2/2010 | Baumgart |
| 2010/0076987 A1 | 3/2010 | Schreiner |
| 2010/0100963 A1 | 4/2010 | Mahaffey |
| 2010/0106557 A1 | 4/2010 | Buss |
| 2010/0121707 A1 | 5/2010 | Goeldi |
| 2010/0161662 A1* | 6/2010 | Jonas .................. G06Q 30/02 707/780 |
| 2010/0169137 A1 | 7/2010 | Jastrebski et al. |
| 2010/0180048 A1 | 7/2010 | Guo et al. |
| 2010/0205541 A1 | 8/2010 | Rapaport et al. |
| 2010/0217525 A1 | 8/2010 | King et al. |
| 2010/0250605 A1 | 9/2010 | Pamu et al. |
| 2010/0262610 A1 | 10/2010 | Acosta et al. |
| 2010/0274815 A1 | 10/2010 | Vanasco |
| 2010/0309915 A1 | 12/2010 | Pirbhai et al. |
| 2010/0312644 A1 | 12/2010 | Borgs et al. |
| 2011/0004692 A1* | 1/2011 | Occhino .............. H04L 67/16 709/228 |
| 2011/0029467 A1 | 2/2011 | Spehr et al. |
| 2011/0055897 A1 | 3/2011 | Arasaratnam |
| 2011/0113098 A1 | 5/2011 | Walsh et al. |
| 2011/0113149 A1 | 5/2011 | Kaal |
| 2011/0125921 A1 | 5/2011 | Karenos et al. |
| 2011/0173344 A1 | 7/2011 | Mihaly et al. |
| 2011/0184983 A1* | 7/2011 | Kwantes .............. G06F 16/34 707/776 |
| 2011/0208866 A1 | 8/2011 | Marmolejo-Meillon et al. |
| 2011/0219034 A1 | 9/2011 | Dekker et al. |
| 2011/0246237 A1 | 10/2011 | Vdovjak |
| 2011/0246412 A1 | 10/2011 | Skelton |
| 2011/0265011 A1 | 10/2011 | Taylor et al. |
| 2011/0283205 A1 | 11/2011 | Nie et al. |
| 2011/0295626 A1 | 12/2011 | Chen et al. |
| 2011/0314557 A1 | 12/2011 | Marshall |
| 2012/0109714 A1 | 5/2012 | Azar |
| 2012/0110005 A1* | 5/2012 | Kuo .................... G06F 16/176 707/769 |
| 2012/0182822 A1 | 6/2012 | Hayashi |
| 2012/0182882 A1 | 7/2012 | Chrapko et al. |
| 2012/0197758 A1 | 8/2012 | Zhong et al. |
| 2012/0204265 A1 | 8/2012 | Judge |
| 2012/0278767 A1 | 11/2012 | Cabler et al. |
| 2012/0282884 A1 | 11/2012 | Sun |
| 2012/0290427 A1 | 11/2012 | Reed et al. |
| 2012/0317149 A1 | 12/2012 | Jagota et al. |
| 2012/0317200 A1 | 12/2012 | Chan |
| 2012/0324027 A1 | 12/2012 | Vaynblat et al. |
| 2013/0013807 A1 | 1/2013 | Chrapko et al. |
| 2013/0054598 A1 | 2/2013 | Caceres |
| 2013/0073387 A1 | 3/2013 | Heath |
| 2013/0097180 A1 | 4/2013 | Tseng |
| 2013/0097184 A1 | 4/2013 | Berkhim et al. |
| 2013/0110732 A1 | 5/2013 | Uppal |
| 2013/0124542 A1 | 5/2013 | Lee et al. |
| 2013/0138741 A1 | 5/2013 | Redstone et al. |
| 2013/0166601 A1 | 6/2013 | Chrapko et al. |
| 2013/0173457 A1 | 7/2013 | Chrapko et al. |
| 2013/0198811 A1 | 8/2013 | Yu et al. |
| 2013/0254305 A1 | 9/2013 | Cheng et al. |
| 2013/0282884 A1 | 10/2013 | Chandrasekaran et al. |
| 2013/0290226 A1 | 10/2013 | Dokken |
| 2013/0291098 A1 | 10/2013 | Chung et al. |
| 2013/0332740 A1 | 12/2013 | Sauve et al. |
| 2014/0081652 A1 | 3/2014 | Klindworth |
| 2014/0089189 A1 | 3/2014 | Vasireddy |
| 2014/0114962 A1 | 4/2014 | Rosenburg et al. |
| 2014/0156274 A1 | 6/2014 | You et al. |
| 2014/0172708 A1 | 6/2014 | Chrapko et al. |
| 2014/0173723 A1 | 6/2014 | Singla et al. |
| 2014/0185430 A1 | 7/2014 | Li et al. |
| 2014/0258160 A1 | 9/2014 | Chrapko et al. |
| 2014/0258305 A1 | 9/2014 | Kapadia et al. |
| 2014/0278730 A1 | 9/2014 | Muhart et al. |
| 2014/0279352 A1 | 9/2014 | Schaefer et al. |
| 2014/0280151 A1 | 9/2014 | Micaelian |
| 2014/0287725 A1 | 9/2014 | Lee |
| 2014/0304339 A1 | 10/2014 | Hamilton |
| 2014/0317003 A1 | 10/2014 | Shah |
| 2014/0317107 A1 | 10/2014 | Gharpure et al. |
| 2015/0019565 A1 | 1/2015 | Lijachev et al. |
| 2015/0026120 A1 | 1/2015 | Chrapko et al. |
| 2015/0089568 A1 | 3/2015 | Sprague et al. |
| 2015/0121456 A1 | 4/2015 | Milman et al. |
| 2015/0142595 A1 | 5/2015 | Acuña-Rohter |
| 2015/0163217 A1 | 6/2015 | Paterson et al. |
| 2015/0169142 A1* | 6/2015 | Longo .............. H04M 1/72457 715/751 |
| 2015/0213407 A1* | 7/2015 | Cabler .................. G06F 30/20 705/300 |
| 2015/0220835 A1 | 8/2015 | Wilson et al. |
| 2015/0242856 A1 | 8/2015 | Dhurandhar et al. |
| 2015/0271206 A1 | 9/2015 | Schultz et al. |
| 2015/0347591 A1 | 12/2015 | Bax et al. |
| 2015/0359039 A1 | 12/2015 | Haque et al. |
| 2015/0370801 A1 | 12/2015 | Shah |
| 2016/0004741 A1* | 1/2016 | Johnson .............. G06F 21/6218 707/783 |
| 2016/0035046 A1 | 2/2016 | Gupta et al. |
| 2016/0073271 A1 | 3/2016 | Schultz et al. |
| 2016/0171011 A1 | 6/2016 | Drogobetski et al. |
| 2016/0171113 A1 | 6/2016 | Fanous et al. |
| 2016/0180840 A1* | 6/2016 | Siddiq .............. H04N 21/4828 704/257 |
| 2016/0197788 A1 | 7/2016 | Chrapko et al. |
| 2016/0253679 A1* | 9/2016 | Venkatraman ..... G06Q 30/0185 705/310 |
| 2016/0277424 A1 | 9/2016 | Mawji et al. |
| 2017/0024749 A1* | 1/2017 | Barathy ............ G06Q 30/0277 |
| 2017/0083820 A1* | 3/2017 | Huang .............. G06F 16/3346 |
| 2017/0236078 A1 | 8/2017 | Rasumov |
| 2017/0293696 A1* | 10/2017 | Bendersky ............. G06N 5/022 |
| 2018/0068010 A1* | 3/2018 | Paterson .................. G06F 16/93 |
| 2019/0385130 A1 | 12/2019 | Mossoba et al. |

FOREIGN PATENT DOCUMENTS

| | | |
|---|---|---|
| CN | 1619567 A | 5/2005 |
| CN | 101167093 A | 4/2008 |
| CN | 101383695 A | 3/2009 |
| CN | 101393566 A | 3/2009 |

(56) References Cited

FOREIGN PATENT DOCUMENTS

| | | | |
|---|---|---|---|
| CN | 101403978 | A | 4/2009 |
| CN | 101438279 | A | 5/2009 |
| CN | 101443806 | A | 5/2009 |
| CN | 101841539 | A | 9/2010 |
| CN | 101902459 | A | 12/2010 |
| CN | 102136114 | A | 7/2011 |
| CN | 102668457 | A | 9/2012 |
| CN | 102685661 | A | 9/2012 |
| CN | 102855572 | A | 1/2013 |
| CN | 103095728 | A | 5/2013 |
| CN | 103456233 | A | 12/2013 |
| CN | 103493049 | A | 1/2014 |
| CN | 103593764 | A | 2/2014 |
| CN | 104504043 | A | 4/2015 |
| CN | 102823225 | B | 9/2015 |
| CN | 104915391 | A | 9/2015 |
| CN | 104954492 | A | 9/2015 |
| CN | 109690608 | A | 4/2019 |
| EP | 1511232 | A1 | 3/2005 |
| JP | 2001-298453 | A | 10/2001 |
| JP | 2002/123649 | A | 4/2002 |
| JP | 2003-259070 | A | 9/2003 |
| JP | 2005/149202 | A | 6/2005 |
| JP | 2005339281 | A | 12/2005 |
| JP | 2006-113900 | A | 4/2006 |
| JP | 2006-260099 | A | 9/2006 |
| JP | 2007-004411 | A | 1/2007 |
| JP | 2007-249413 | A | 9/2007 |
| JP | 2008-129990 | A | 6/2008 |
| JP | 2009-025871 | A | 2/2009 |
| JP | 2009-064433 | A | 3/2009 |
| JP | 2009-146253 | A | 7/2009 |
| JP | 2013/506204 | A | 2/2013 |
| KR | 2019860 | B1 | 9/2019 |
| TW | 201250611 | A | 12/2012 |
| WO | 2006/019752 | A1 | 2/2006 |
| WO | 2006/115919 | A2 | 11/2006 |
| WO | 2007/085903 | A2 | 8/2007 |
| WO | 2009/002193 | A1 | 12/2008 |
| WO | 2009/020964 | A2 | 2/2009 |
| WO | 2009/109009 | A1 | 9/2009 |
| WO | 2010/048172 | A1 | 4/2010 |
| WO | 2011/106897 | A1 | 9/2011 |
| WO | 2011/134086 | A1 | 11/2011 |
| WO | 2011/143761 | A1 | 11/2011 |
| WO | 2011/127206 | A3 | 4/2012 |
| WO | 2013/026095 | A1 | 2/2013 |
| WO | 2013/173790 | A1 | 11/2013 |
| WO | 2014/144114 | A1 | 9/2014 |
| WO | 2015/047992 | A2 | 4/2015 |
| WO | 2015/106657 | A1 | 7/2015 |
| WO | 2016/011371 | A1 | 1/2016 |
| WO | WO-2017019203 | A1 * | 2/2017 ............. G06F 17/30 |

OTHER PUBLICATIONS

Notice of allowance received for Israel patent Application No. 261465 dated Mar. 17, 2020, 3 pages.
Notice of allowance received for Israel patent Application No. 261921 dated Mar. 19, 2020, 02 pages.
Notice of allowance received for Israel patent Application No. 261207 dated Mar. 15, 2020, 02 pages.
Final Office Action received for U.S. Appl. No. 15/474,785 dated Oct. 16, 2020, 55 pages.
Final Office Action received for U.S. Appl. No. 16/534,474 dated Mar. 10, 2021, 41 pages.
Non-Final Office Action received for U.S. Appl. No. 16/835,433 dated Mar. 18, 2021, 94 pages.
Notice of Reasons for Refusal received for Japanese Application Serial No. 2019-500705 dated Apr. 6, 2021, 09 pages.
Non-Final Office Action received for U.S. Appl. No. 17/158,840 dated May 19, 2021, 38 pages.

Tang, et al. Social influence analysis in large-scale networks. p. 807. Proceedings of the ACM SIGKDD International Conference on Knowledge Discovery and Data Mining ; KDD '09: Proceedings of the 15th ACM SIGKDD International Conference on Knowledge Discovery and Data Mining (15th ACM SIGKDD International Conference on Knowledge Discovery and Data Mining, KDD '09—Jun. 28, 2009 to Jul. 1, 2009—Paris), Jan. 1, 2009; Jun. 28, 2009—Jul. 1, 2009 ACM, 2 Penn Plaza, Suite 701 New York NY 10121-0701 USA.
Non-Final Office Action for U.S. Appl. No. 13/521,216, dated Jun. 20, 2014.
Final Office Action for U.S. Appl. No. 13/521,216, dated May 21, 2015.
Non-Final Office Action for U.S. Appl. No. 13/521,216, dated Apr. 13, 2016.
Final Office Action for U.S. Appl. No. 13/521,216, dated Oct. 21, 2016.
Final Office Action for U.S. Appl. No. 13/503,352, dated Jan. 5, 2015, 28 pages.
Non-Final Office Action for U.S. Appl. No. 13/503,352, dated Aug. 21, 2014, 24 pages.
Non-Final Office Action for U.S. Appl. No. 13/503,352, dated Aug. 18, 2015, 26 pages.
Non-Final Office Action for U.S. Appl. No. 15/224,063, dated Sep. 1, 2016, 47 pages.
Non-Final Office Action for U.S. Appl. No. 13/695,419, dated Oct. 31, 2014, 20 pages.
Final Office Action for U.S. Appl. No. 13/695,419, dated Jun. 2, 2015, 31 pages.
Non-Final Office Action for U.S. Appl. No. 13/695,419, dated Dec. 17, 2015, 43 pages.
Non-Final Office Action for U.S. Appl. No. 13/695,419, dated Apr. 5, 2016, 72 pages.
Non-Final Office Action for U.S. Appl. No. 13/695,419, dated Oct. 12, 2016, 147 pages.
Non-Final Office Action for U.S. Appl. No. 13/824,324, dated Mar. 9, 2017, 17 pages.
Non-Final Office Action for U.S. Appl. No. 14/664,285, dated Jun. 4, 2015, 25 pages.
Final Office Action for U.S. Appl. No. 14/664,285, dated Sep. 21, 2015, 33 pages.
Non-Final Office Action for U.S. Appl. No. 14/664,285, dated Mar. 4, 2016, 24 pages.
Final Office Action for U.S. Appl. No. 14/664,285, dated Jul. 29, 2016, 29 pages.
Non-Final Office Action for U.S. Appl. No. 15/070,643, dated Aug. 26, 2016, 36 pages.
Non-Final Office Action for U.S. Appl. No. 15/589,841, dated Jun. 5, 2017, 40 pages.
International Search Report and Written Opinion for International Patent Application No. PCT/CA2017/050257 mailed May 19, 2017, pages.
International Search Report and Written Opinion for International Patent Application No. PCT/CA2017/050197 mailed May 30, 2017, 15 pages.
Non-Final Office Action For U.S. Appl. No. 15/466,590, dated Jul. 13, 2017, 20 pages.
Non-Final Office Action For U.S. Appl. No. 15/055,952, dated Aug. 12, 2016, 33 pages.
International Search Report and Written Opinion for International Patent Application No. PCT/CA2017/050255 mailed on Jun. 19, 2017, 9 pages.
Non-Final Office Action for U.S. Appl. No. 13/695,419, mailed Jun. 14, 2017, 44 pages.
Japanese Office Action dated Jul. 28, 2017, mailed Aug. 2, 2017 for Japanese Patent Application No. 2016-131310, 4 pages.
Non-Final Office Action for U.S. Appl. No. 15/224,063, mailed Jul. 14, 2017, 36 pages.
Non-Final Office Action for U.S. Appl. No. 15/400,471, mailed Aug. 7, 2017, 24 pages.
Non-Final Office Action for U.S. Appl. No. 15/630,299, mailed Aug. 10, 2017, 17 pages.

(56) References Cited

OTHER PUBLICATIONS

International Search Report and Written Opinion for International Patent Application No. PCT/CA2017/050351 mailed on Jun. 19, 2017, 10 pages.
Non-Final Office Action for U.S. Appl. No. 15/671,102 dated Sep. 22, 2017, 21 pages.
Non-Final Office Action for U.S. Appl. No. 15/675,041 dated Oct. 6, 2017, 72 pages.
Canadian Office Action for Canadian Application Serial No. 2,775,899 dated Oct. 12, 2017, 6 pages.
Notice of Allowance for U.S. Appl. No. 13/695,419 dated Nov. 8, 2017, 92 pages.
Final Office Action for U.S. Appl. No. 13/824,324, dated Nov. 30, 2017, 33 pages.
Decision to Grant a Patent and English Translation thereof dated Nov. 14, 2017 for Japanese Patent Application No. 2016-131310, 6 pages.
International Search Report and Written Opinion for International Patent Application No. PCT/CA2010/001531 mailed on Jan. 10, 2011, 9 pages.
Notification of Reasons for Refusal and English Translation thereof mailed on Mar. 29, 2016 for Japanese Patent Application No. 2015-085003, 4 pages.
Decision to Grant a Patent and English Translation thereof dated Jun. 2, 2016 for Japanese Patent Application No. 2015-085003, 6 pages.
Notification of Reasons for Refusal and English Translation thereof mailed on Apr. 3, 2014 for Japanese Patent Application No. 2012-531192, 7 pages.
Decision to Grant a Patent and English Translation thereof dated Feb. 16, 2015 for Japanese Patent Application No. 2012-531192, 6 pages.
Extended European Search Report for European Patent Application No. 10819770.8 dated Oct. 9, 2014, 7 pages.
Communication pursuant to Rules 70(2) for European Patent Application No. 10819770.8 dated Oct. 28, 2014, 1 page.
Communication pursuant to Article 94(3) EPC for European Patent Application No. 10819770.8 dated Feb. 8, 2016, 7 pages.
Decision to Refuse European Patent Application No. 10819770.8 dated Apr. 18, 2017, 6 pages.
Chinese First Office Action and English Translation thereof mailed on Mar. 24, 2014 for Chinese Application Serial No. 201080051338.X, 31 pages.
Chinese Second Office Action and English Translation thereof mailed on Jan. 16, 2015 for Chinese Application Serial No. 201080051338.X, 26 pages.
Chinese Third Office Action and English Translation thereof mailed on Sep. 28, 2015 for Chinese Application Serial No. 201080051338.X, 12 pages.
Final Office Action for U.S. Appl. No. 15/079,952, dated Dec. 16, 2016, 14 pages.
International Search Report and Written Opinion for International Patent Application No. PCT/CA2016/050305 mailed Jun. 3, 2016, 7 pages.
Notice of Allowance for U.S. Appl. No. 15/224,172, dated Oct. 14, 2016, 35 pages.
Notice of Allowance for U.S. Appl. No. 15/056,484, dated Jul. 13, 2016, 31 pages.
Non-Final Office Action for U.S. Appl. No. 15/079,952, dated Jul. 14, 2016, 26 pages.
Notice of Allowance for U.S. Appl. No. 14/664,285, dated Oct. 7, 2016, 27 pages.
Notice of Allowance for U.S. Appl. No. 15/070,643, dated Apr. 7, 2017, 28 pages.
Notice of Allowance for U.S. Appl. No. 15/406,405, dated Apr. 6, 2017, 27 pages.
Non-Final Office Action for U.S. Appl. No. 15/070,643, dated Feb. 24, 2017, 34 pages.
Safaei et al., "Social Graph Generation & Forecasting Using Social Network Mining", Proceedings of the 33rd Annual IEEE International Computer Software and Applications Conference, COMPSAC '09, 2009, pp. 31-35.
Taiwanese Office Action for Taiwanese Patent Application No. 105108584 dated Oct. 31, 2016, 7 pages.
Non-Final Office Action for U.S. Appl. No. 13/498,429, dated Apr. 17, 2014, 24 pages.
Non-Final Office Action for U.S. Appl. No. 13/498,429, dated Jul. 25, 2014, 18 pages.
Final Office Action for U.S. Appl. No. 13/498,429, dated Jan. 16, 2015, 21 pages.
Non-Final Office Action for U.S. Appl. No. 14/282,935, dated Jul. 21, 2014, 26 pages.
Final Office Action for U.S. Appl. No. 14/282,935, dated Jan. 30, 2015, 42 pages.
Non-Final Office Action for U.S. Appl. No. 14/282,935, dated Aug. 5, 2015, 7 pages.
Final Office Action for U.S. Appl. No. 14/282,935, dated Feb. 12, 2016, 13 pages.
Non-Final Office Action for U.S. Appl. No. 15/254,642, dated Dec. 28, 2016, 29 pages.
Notice of Allowance received for U.S. Appl. No. 16/410,272 dated Apr. 28, 2020, 54 pages.
Notice of allowance received for Israel patent Application No. 261464 dated Jul. 1, 2020, 5 pages.
Non-Final Office Action received for U.S. Appl. No. 16/534,474 dated Jul. 2, 2020, 99 pages.
Notification to Grant Patent Right for Invention and English Translation thereof mailed on Mar. 22, 2016 for Chinese Application Serial No. 201080051338.X, 4 pages.
International Search Report and Written Opinion for International Patent Application No. PCT/CA2011/050017 mailed on Apr. 13, 2011, 9 pages.
International Search Report and Written Opinion for International Patent Application No. PCT/CA2010/001658 mailed on Jan. 26, 2011, 9 pages.
International Search Report and Written Opinion for International Patent Application No. PCT/CA2011/050260 mailed on Jul. 26, 2011, 7 pages.
Final Office Action dated Dec. 15, 2017 for U.S. Appl. No. 15/224,063, 52 pages.
Non-Final Office Action dated Dec. 15, 2017 for U.S. Appl. No. 15/589,841, 66 pages.
Final Office Action dated Jan. 19, 2018 for U.S. Appl. No. 15/466,590, 56 pages.
Final Office Action dated Jan. 26, 2018 for U.S. Appl. No. 15/400,471, 78 pages.
Final Office Action dated Feb. 8, 2018, for U.S. Appl. No. 15/630,299, 40 pages.
International Search Report and Written Opinion for International Patent Application No. PCT/CA2017/050962 mailed on Nov. 20, 2017, 9 pages.
Non-Final Office Action received for U.S. Appl. No. 15/644,356, dated Apr. 5, 2018, 74 pages.
Notice of Allowance received for U.S. Appl. No. 15/589,841, dated Mar. 20, 18, 44 pages.
Non-Final Office Action received for U.S. Appl. No. 15/046,041, dated Apr. 26, 2018, 70 pages.
Non-Final Office Action received for U.S. Appl. No. 15/907,164, dated May 24, 2018 29 pages.
Final Office Action received for U.S. Appl. No. 15/675,041 dated May 17, 2018, 73 pages.
Non-Final Office Action received for U.S. Appl. No. 15/400,471, dated May 29, 2018, 34 pages.
Non-Final Office Action received for U.S. Appl. No. 15/630,299, dated May 17, 2018, 19 pages.
Notice of Allowance for U.S. Appl. No. 15/953,011 dated Aug. 28, 2018, 72 pages.
First Action Interview Pilot Program Pre-Interview Communication for U.S. Appl. No. 15/953,011 dated Jul. 10, 2018, 10 pages.
First Action Interview Pilot Program Pre-Interview Communication for U.S. Appl. No. 15/907,166 dated Jul. 6, 2018, 6 pages.

(56) References Cited

OTHER PUBLICATIONS

Final Office Action for U.S. Appl. No. 15/400,471 dated Oct. 29, 2018, 42 pages.
Final Office Action for U.S. Appl. No. 15/644,356 dated Oct. 18, 2018, 41 pages.
Non-Final Office Action for U.S. Appl. No. 16/014,032 dated Oct. 4, 2018, 74 pages.
First Action Interview Pilot Program Communication for U.S. Appl. No. 15/907,166 dated Oct. 31, 2018, 46 pages.
Final Office Action for U.S. Appl. No. 15/907,164 dated Nov. 14, 2018, 70 pages.
Chinese First Office Action and English Translation thereof mailed on Sep. 4, 2018 for Chinese Application Serial No. 201610392926.9, 17 pages.
Final Office Action for U.S. Appl. No. 15/046,041 dated Nov. 20, 2018, 32 pages.
Non-Final Office Action for U.S. Appl. No. 16/141,615 dated Nov. 29, 2018, 15 pages.
www.trustscience.com Inc., et al., "Defendants' Motion for Stay of Discovery Pending Decision on Motion to Dismiss," Case 6:18-cv-01174-CEM-DCI, Document 32, Filed Sep. 21, 2018, 12 pages.
www.trustscience.com Inc., et al., "Plaintiff's Response in Opposition to Defendants' Motion to Stay Discovery Pending Decision on Motion to Dismiss," Case 6:18-cv-01174-CEM-DCI, Document 35, Filed Oct. 5, 2018, 20 pages.
www.trustscience.com Inc., et al., "Motion to Dismiss the Complaint and Memorandum of Law in Support," Case 6:18-cv-01174-CEM-DCI, Document 41, Filed Oct. 19, 2018, 36 pages.
www.trustscience.com Inc., et al., "Plaintiff's Response to Defendants' Motion to Dismiss and Notice of Intent to File Amended Complaint," Case 6:18-cv-01174-CEM-DCI, Document 44, Filed Nov. 2, 2018, 3 pages.
www.trustscience.com Inc., et al., "First Amended Complaint and Demand for Injunctive Relief and Jury Trial," Case 6:18-cv-01174-CEM-DCI, Document 46 Filed Nov. 6, 2018, 49 pages.
www.trustscience.com Inc., et al., "Order and Permanent Injunction," Case 6:18-cv-01174-CEM-DCI, Document 49 Filed Nov. 21, 2018, 4 pages.
Examiner's Report for Canadian Application Serial No. 2,775,899 dated Oct. 2, 2018, 8 pages.
Non-Final Office Action recevied for U.S. Appl. No. 15/675,041 dated Jan. 11, 2019, 91 pages.
Non-Final Office Action for U.S. Appl. No. 16/204,651 dated Jan. 29, 2019, 47 pages.
Notice of Allowance for U.S. Appl. No. 16/195,946 dated Feb. 14, 2019, 69 pages.
Notice of Allowance for U.S. Appl. No. 15/400,471 dated Mar. 21, 2019, 47 pages.
Non-Final office Action recevied for U.S. Appl. No. 15/644,356 dated Mar. 21, 2019, 39 pages.
First Office Action received for Chinese Patent Application Serial No. 201610392929.2 dated Mar. 14, 2019, 20 pages.
Final Office Action received for U.S. Appl. No. 15/907,166 dated Apr. 24, 2019, 27 pages.
Final Office Action received for U.S. Appl. No. 16/014,032 dated Apr. 17, 2019, 38 pages.
International Search Report and Written Opinion for International Patent Application No. PCT/CA2011/050569 mailed Dec. 5, 2011, 9 pages.
Non-Final Office Action received for U.S. Appl. No. 15/046,041 dated May 22, 2019, 37 pages.
Final Office Action received for U.S. Appl. No. 16/204,651 dated Jul. 19, 2019, 34 pages.
Final Office Action received for U.S. Appl. No. 16/141,615 dated Jul. 30, 2019, 78 pages.
Final Office Action received for U.S. Appl. No. 15/675,041 dated Jul. 29, 2019, 61 pages.
Non-Final Office Action received for U.S. Appl. No. 15/907,164 dated Aug. 20, 2019, 52 pages.
Non-Final Office Action received for U.S. Appl. No. 16/166,581 dated Sep. 18, 2019, 92 pages.
Non-Final Office Action received for U.S. Appl. No. 16/166,581 dated Jul. 28, 2020, 74 pages.
Canadian Office Action for Canadian Application Serial No. 3,033,793 dated Sep. 2, 2020, 6 pages.
Communication pursuant to Article 94(3) EPC for European Patent Application No. 17840662.5 dated Aug. 31, 2020, 3 pages.
Canadian Office Action for Canadian Application Serial No. 2,775,899 dated Oct. 7, 2020, 3 pages.
Final Office Action received for U.S. Appl. No. 15/046,041 dated Sep. 10, 2019, 23 pages.
Final Office Action received for U.S. Appl. No. 16/014,032 dated Oct. 1, 2019, 35 pages.
Non-Final Office Action received for U.S. Appl. No. 16/410,272 dated Oct. 11, 2019, 65 pages.
Canadian Office Action received for Patent Application Serial No. 2,775,899 dated Oct. 8, 2019, 6 pages.
Indian First Office Action received for Indian Patent Application Serial No. 735/KOLNP/2012 dated Aug. 23, 2019, 7 pages.
Notice Before Examining Pursuant to Section 41 of Law and Rule 66 of the Regulations received for Israel patent Application No. 261207 dated Oct. 27, 2019, 2 pages.
Notice Before Examining Pursuant to Section 41 of Law and Rule 66 of the Regulations received for Israel patent Application No. 261921 dated Nov. 4, 2019, 2 pages.
Non-Final Office Action received for U.S. Appl. No. 15/474,785 dated Nov. 12, 2019, 127 pages.
Extended European Search Report for European Patent Application No. 17840662.5 dated Jan. 2, 2020, 9 pages.
Second Office Action received for Chinese Patent Application Serial No. 201610392929.2 dated Nov. 20, 2019, 8 pages.
Final Office Action received for U.S. Appl. No. 15/644,356 dated Dec. 30, 2019, 68 pages.
Notice Before Examining Pursuant to Section 41 of Law and Rule 66 of the Regulations received for Israel patent Application No. 261464 dated Nov. 4, 2019, 2 pages.
Notice Before Examining Pursuant to Section 41 of Law and Rule 66 of the Regulations received for Israel patent Application No. 261465 dated Nov. 4, 2019, 2 pages.
Notification under Section 18 of the Law received for Israel patent Application No. 264827 dated Jan. 7, 2020, 2 pages.
Communication pursuant to Rules 70(2) and 70a(2) EPC received for EP Patent Application Serial No. 17840662.5 dated Jan. 21, 2020, 1 page.
Office Action received for Brazialian Patent Application Serial No. BR112012007316-8 dated Mar. 10, 2020, 5 pages (Including English Translation).
Non-Final Office Action received for U.S. Appl. No. 16/801,295 dated Jun. 15, 2021, 111 pages.
Non-Final Office Action received for U.S. Appl. No. 16/801,295 dated Jun. 16, 2021, 88 pages.
Non-Final Office Action received for U.S. Appl. No. 16/774,744 dated Jun. 24, 2021, 126 pages.
Non-Final Office Action received for U.S. Appl. No. 16/773,382 dated Jul. 28, 2021, 105 pages.
Liu et al., "Hybrid content filtering and reputation-based popularity for recommending blog articles", Bradford vol. 38, No. 6, Jun. 23, 2014, pp. 788-805.
Office Action received for Mexican Patent Application Serial No. MX/a/2018/010005 dated May 18, 2021, 8 pages. (Including English Translation).
Office Action received for Indian Patent Application Serial No. 201847032355 dated Aug. 31, 2021, 6 pages.
Office Action received for Canadian Patent Application Serial No. 3,015,926 dated Aug. 17, 2021, 3 pages.
Notification to Grant Patent Right for Invention received for Chinese Patent Application Serial No. 201780025229.2 dated May 28, 2021, 5 pages. (Including English Translation).
Office Action received for Canadian Patent Application Serial No. 3,014,995 dated Aug. 12, 2021, 4 pages.
Office Action received for Canadian Patent Application Serial No. 3,014,361 dated Aug. 18, 2021, 5 pages.

(56) References Cited

OTHER PUBLICATIONS

Office Action received for Canadian Patent Application Serial No. 3,016,091 dated Aug. 19, 2021, 7 pages.
Non-Final Office Action received for U.S. Appl. No. 16/534,474 dated Jan. 19, 2022, 44 pages.
Office Action received for Mexican Patent Application Serial No. MX/a/2018/010423 dated Nov. 25, 2021, 11 pages.
Office Action received for Mexican Patent Application Serial No. MX/a/2018/010005 dated Nov. 30, 2021, 9 pages.
Non-Final Office Action received for U.S. Appl. No. 17/079,600 dated Dec. 3, 2021, 84 pages.
Office Action received for Indian Patent Application Serial No. 201847032375 dated Oct. 29, 2021, 8 pages.
Office Action received for taiwan Patent Application No. 106127464 dated Oct. 1, 2021, 17 pages.
Notice of Allowance received for U.S. Appl. No. 17/158,840, dated Dec. 24, 2021, 97 pages.
Mexican Office Action dated May 27, 2022 for Mexican Patent Application No. MX/a/2018/011618, 3 pages.
Final Office Action received for U.S. Appl. No. 16/773,382 dated May 24, 2022, 40 pages.
Non Final Office Action received for U.S. Appl. No. 17/231,658 dated Jun. 16, 2022, 129 pages.
Non Final Office Action received for U.S. Appl. No. 16/995,293 dated Jul. 6, 2022, 123 pages.
Summons to attend oral proceedings received for European Patent Application Serial No. 17840662.5 dated May 23, 2022, 11 pages.
Office Action received for Mexican Patent Application Serial No. MX/a/2018/010005 dated May 17, 2022, 12 pages.
Mexican Notice of Allowance dated May 19, 2022 for Mexican Patent Application No. MX/a/2018/010423, 2 pages.
Japanese Notice of Allowance dated Feb. 15, 2022 for Japanese Patent Application No. 2019-500705, 5 pages.
Final Office Action received for U.S. Appl. No. 16/774,744 dated Apr. 14, 2022, 86 pages.
Office Action received for Canadian Patent Application Serial No. 3014361 dated Mar. 16, 2022, 4 pages.
Final Office Action received for U.S. Appl. No. 17/079,600 dated Aug. 25, 2022, 36 pages.
Final Office Action received for U.S. Appl. No. 16/534,474 dated Aug. 24, 2022, 117 pages.
Mexican Office Action received for Mexican Patent Application Serial No. MX/a/2018/010426 dated Jul. 12, 2022, 7 pages.
Notice of Allowance received for Canadian Patent Application No. 3014995 dated Sep. 6, 2022, 1 page.
First Office Action received for Chinese Patent Application Serial No. 201780030761.3 dated Nov. 21, 2022, 22 pages.(Including English Translation).
Decision to refuse a euro received for European Patent Application Serial No. 17840662.5 dated Nov. 18, 2022, 14 pages.
First Office Action received for Chinese Patent Application Serial No. 201780025677.2 dated Oct. 13, 2022, 12 pages.(Including English Translation).
Shang Jiang et al., "Application of incidence matrix method in credit evaluation", Journal of Shenyang Normal University (Natural Science), Jul. 15, 2007, pp. 308-310, 11 pages (including English Translation).
Shen Limin et al., "Adaptive trust model based on time series analysis in opportunistic network", Journal of Chinese Computer Systems No. 7, Jul. 15, 2015, pp. 1553-1558, 37 pages (including English Translation).
First Office Action received for Chinese Patent Application Serial No. 201780024074.0 dated Oct. 10, 2022, 20 pages.(Including English Translation).
Final Office Action received for U.S. Appl. No. 17/231,658 dated May 10, 2023, 97 pages.
Non-Final Office Action received for U.S. Appl. No. 17/805,750 dated Jun. 2, 2023, 124 pages.
Office Action received for Chinese Patent Application Serial No. 201780024074.0 dated Apr. 11, 2023, 22 pages.
Notice of Allowance received for Canadian Patent Application Serial No. 3014361 dated Apr. 27, 2023, 1 page.
Office Action received for Mexican Patent Application Serial No. MX/a/2018/011618 dated Jan. 27, 2023, 16 pages (with machine translation).
Notice of Allowance received for Canadian Patent Application No. 3016091 dated Mar. 2, 2023, 1 page.
Non-Final Office Action received for U.S. Appl. No. 18/046,382 dated Mar. 16, 2023, 139 pages.
Non-Final Office Action received for U.S. Appl. No. 16/534,474 dated Mar. 16, 2023, 49 pages.
Non-Final Office Action received for U.S. Appl. No. 17/659,292 dated Mar. 28, 2023, 124 pages.
Non-Final Office Action received for U.S. Appl. No. 17/079,600 dated Apr. 7, 2023, 30 pages.
Notice of Allowance received for U.S. Appl. No. 16/995,293 dated Mar. 1, 2023, 7 pages.
Office Action received for Mexican Patent Application Serial No. MX/a/2019/001858 dated Apr. 21, 2023, 12 pages (including machine translation).
First Office Action received for Mexican Patent Application Serial No. MX/a/2019/001858 dated Nov. 24, 2022, 8 pages.(Including English Translation).
Notice of Allowance received for U.S. Appl. No. 16/773,382 dated Dec. 21, 2022, 43 pages.
Notice of Allowance received for U.S. Appl. No. 16/995,293 dated Jan. 24, 2023, 73 pages.
Notice of Allowance received for Chinese Patent Application Serial No. 201780030761.3 dated Jul. 10, 2023, 12 pages (including English machine translation).
Li, Han "Research on Trust Recommendation and Friend Search Filtering Algorithm in Social Networks" Yanshan University, 2012, 160 pages (including English Translation).
Notice of Allowance received for U.S. Appl. No. 16/534,474 dated Oct. 3, 2023, 62 pages.
Non-Final Office Action received for U.S. Appl No. 17/660,167 dated Sep. 21, 2023, 131 pages.
Non-Final Office Action received for U.S. Appl. No. 18/187,040 dated Sep. 29, 2023, 57 pages.
Notice of Allowance received for Mexican Patent Application Serial No. MX/a/2018/011618, dated Aug. 8, 2023, 3 pages (English Translation).
Non-Final Office Action received for U.S. Appl. No. 18/310,590 dated Oct. 11, 2023, 94 pages.
Office Action received for Mexican Patent Application Serial No. MX/a/2019/001858 dated Oct. 9, 2023, 14 pages (including English translation).
Final Office Action received for U.S. Appl. No. 17/079,600 dated Dec. 5, 2023, 47 pages.
Notice of Allowance received for U.S. Appl. No. 17/659,292 dated Dec. 18, 2023, 95 pages.
Final Office Action received for U.S. Appl. No. 17/805,750 dated Mar. 7, 2024, 51 pages.
Notice of Allowance received for U.S. Appl. No. 17/659,292 dated Mar. 22, 2024, 16 pages.
Notice of Allowance received for U.S. Appl. No. 18/310,590 dated Mar. 13, 2024, 7 pages.
Notice of Allowance received for U.S. Appl. No. 17/660,167 dated Mar. 22, 2024, 7 pages.
Office Action received for Mexican Patent Application Serial No. MX/a/2019/001858 dated Mar. 6, 2024, 10 pages.
Dean et al., "Mapreduce: Simplified Data Processing on Large Clusters", Communications of the ACM, vol. 51, No. 1, Jan. 1, 2008, pp. 107-113.
Final Office Action received for U.S. Appl. No. 18/046,382 dated Dec. 26, 2023, 127 pages.
Notice of Allowance received for U.S. Appl. No. 17/659,292 dated Jan. 19, 2024, 6 pages.
Notice of Allowance received for U.S. Appl. No. 18/310,590 dated Jan. 29, 2024, 48 pages.
Notice of Allowance received for U.S. Appl. No. 17/660,167 dated Feb. 23, 2024, 67 pages.

(56) References Cited

OTHER PUBLICATIONS

Office Action received for Brazilian Patent Application Serial No. BR112019002958-3 dated Jan. 26, 2024, 5 pages (including English translation).
Non Final Office Action received for U.S. Appl. No. 18/357,229 dated Jan. 24, 2024, 90 pages.
Notice of Allowance received for Chinese Patent Application Serial No. 201780024074.0 dated Dec. 8, 2023, 8 pages (including English translation).
Non-Final Office Action received for U.S. Appl. No. 18/187,040 dated Feb. 12, 2025, 111 pages.
Office Action received for Canada Patent Application Serial No. 3,204,616 dated Nov. 22, 2024, 5 pages.
Office Action received for Canada Patent Application Serial No. 3,205,418 dated Nov. 29, 2024, 6 pages.
Notice of Allowance received for U.S. Appl. No. 18/649,423, dated Oct. 17, 2024, 149 pages.
Office Action received for Canada Patent Application Serial No. 3185523 dated Aug. 2, 2024, 5 pages.
Non-Final Office Action received for U.S. Appl. No. 17/805,750, dated Sep. 6, 2024, 38 pages.
Final Office Action received for U.S. Appl. No. 18/187,040, dated Jul. 25, 2024, 63 pages.
Final Office Action received for U.S. Appl. No. 18/357,229, dated Oct. 17, 2024, 50 pages.
Zeng et al., "Trust Path-Searching Algorithm Based on PSO", The 9th International Conference for Young Computer Scientists, IEEE, 2008, pp. 1975-1979.
Non-Final Office Action received for U.S. Appl. No. 18/398,899, dated Aug. 29, 2024, 109 pages.
Office Action received for Mexican Patent Application Serial No. MX/a/2019/001858 dated Sep. 3, 2024, 20 pages.
Notice of Allowance received for U.S. Appl. No. 18/748,766 dated Mar. 17, 2025, 185 pages.
Notice of Allowance received for U.S. Appl. No. 17/805,750 dated Feb. 26, 2025, 48 pages.
Notice of Allowance received for U.S. Appl. No. 18/398,899 dated Mar. 13, 2025, 50 pages.
Substantive Examination Report received for Philippine Patent Application No. 12019500317 dated Apr. 27, 2025, 9 pages.

\* cited by examiner

800

John Smith            Record Date: June 2013

| Facts | Reliability |
|---|---|
| Birthdate: Jan. 2, 1967 | Certain |
| Children:<br>- Adam, 3<br>- Betty, 5 | High |
| Employer: ABC Corp.<br>  Associate, 2 years of employment | Very High |

802

John Smith            Record Date: April 2016

| Facts | Reliability |
|---|---|
| Birthdate: Jan. 2, 1967 | Very High |
| Children:<br>- Adam, 6<br>- Betty, 8<br>- Corey, 12 mos. | High |
| Employer: XYZ Corp.<br>  Associate, 1 year of employment | High |

| John Smith | Record Date: April 2016 | |
|---|---|---|
| Facts | Source Date | |
| Birthdate: Jan. 2, 1967 | April 2016 | |
| Children:<br>- Adam, 6<br>- Betty, 8<br>- Corey, 12 mos. | April 2016 | |
| Current Employer: XYZ Corp.<br>  Associate, 1 year of employment | April 2016 | |
| Former Employer: ABC Corp.<br>  Associate, 2 years of employment | June 2013 | |
| History | Activity Date | Identity % |
| Merge: Record "John Smith" | April 2016 | 97% |
| Merge: Record "J. Smith" | August 2012 | 92% |

FIG. 8B

IDENTITY RESOLUTION IN BIG, NOISY, AND/OR UNSTRUCTURED DATA

CROSS-REFERENCE TO RELATED APPLICATIONS

This application is a continuation of U.S. Patent Application Ser. No. 16/204,651 filed Nov. 29, 2018, which is a continuation of U.S. patent application Ser. No. 15/466,590 (now U.S. Pat. No. 10,180,969), filed Mar. 22, 2017, which applications are incorporated by reference herein in their entireties.

BACKGROUND

Determining the identity of an entity, such as a person, a business, or another organization, is highly useful in a variety of applications. For instance, a party to a transaction can utilize identity verification techniques to confirm the identity of a business or an individual before conducting the transaction with that business or individual. As another example, identity determination techniques can be utilized by law enforcement agencies and/or other entities tasked with locating a specific individual or group of individuals. In the case of these and/or other uses, it is desirable to implement identity verification/matching processes that provide increased robustness and accuracy.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a method of managing data relating to an entity is described herein. The method includes identifying, by at least one device comprising a processor, an entity referenced by input data, generating, by the at least one device, a first record corresponding to the entity in a data structure, populating, by the at least one device, the first record with one or more characteristics of the entity given in the input data, comparing, by the at least one device, characteristics populated in the first record with respective characteristics populated in respective other records of the data structure, and merging, by the at least one device, the first record with a second record in the data structure in response to a result of the comparing, resulting in a merged record.

In another aspect, a system is described herein. The system includes a database comprising a plurality of records corresponding to respective entities, wherein respective ones of the records are populated with characteristics of a respectively corresponding entity. The system further includes at least one processor and a memory that stores processor-executable instructions. The instructions, when executed by the at least one processor, cause the at least one processor to perform operations that include identifying a first entity referenced by an input text source, generating a first record in the database corresponding to the first entity, populating the first record with one or more characteristics of the entity given in the input text source, comparing characteristics populated in the first record with respective characteristics populated in respective other records of the database, and merging the first record with a second record in the data structure in response to a result of the comparing, resulting in a merged record.

In an additional aspect, a non-transitory computer-readable medium is described herein. The computer-readable medium includes processor-executable instructions which, when executed by at least one processor, facilitate performance of operations that include identifying a first entity referenced by input data, generating a first record corresponding to the first entity in a database comprising a plurality of records, populating, by the at least one device, the first record with one or more characteristics of the entity given in the input data, comparing, by the at least one device, characteristics populated in the first record with respective characteristics populated in respective other records of the database, and merging the first record with a second record in the database in response to a result of the comparing, resulting in a merged record.

DESCRIPTION OF DRAWINGS

Various non-limiting embodiments of the subject disclosure are described with reference to the following figures, wherein like reference numerals refer to like parts throughout unless otherwise specified.

FIGS. 8A-8B comprise a diagram illustrating example database record merging operations that can be performed by the system of FIG. 1.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Figure 1:
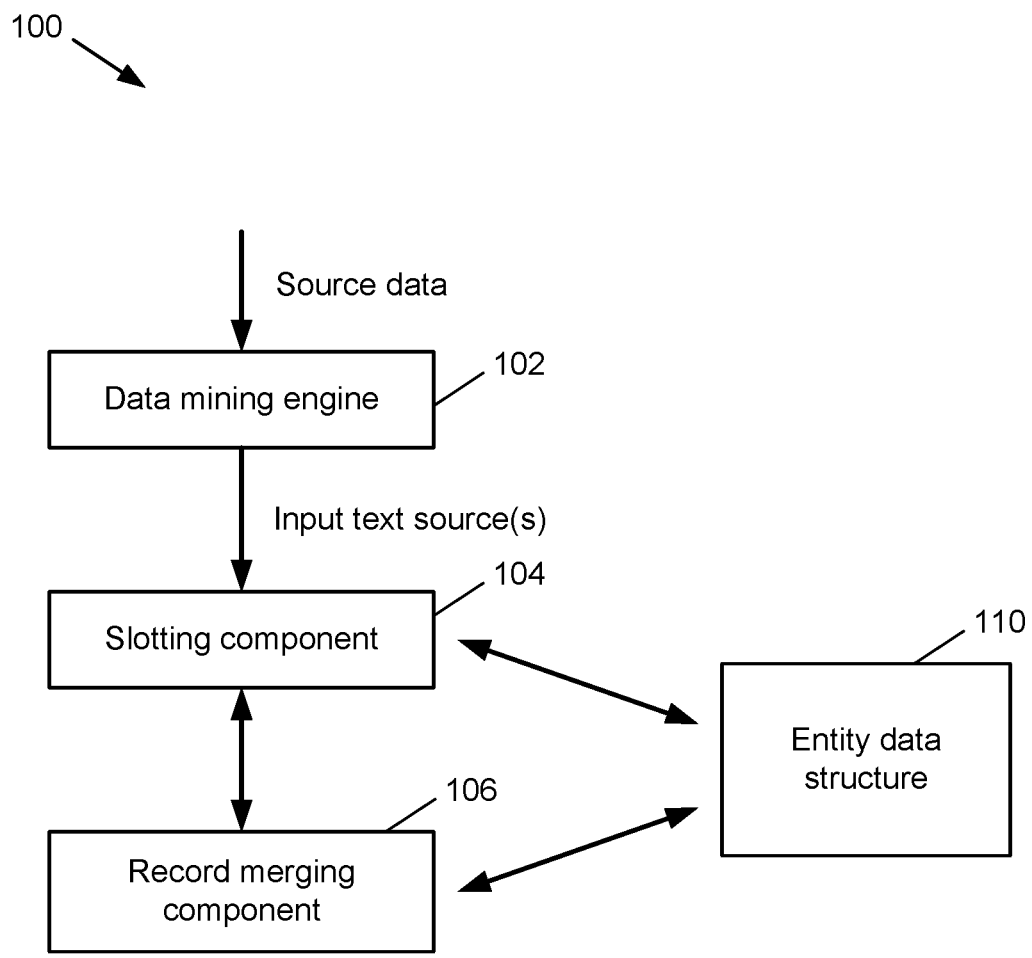
FIG. 1 is a block diagram of a system for identity determination using slotting and inferencing.

With reference first to FIG. 1, a block diagram of a system 100 for identity determination using slotting and inferencing is illustrated. The system 100 includes a data mining engine 102 that obtains input text sources relating to one or more entities and a slotting component 104 and record merging component 106 that generate and maintain records in an entity data structure 110 corresponding to respective entities identified in the input text sources. As used herein, the term "entity" can refer to an individual human being, legal entity (e.g., a public or private company, corporation, limited liability company (LLC), partnership, sole proprietorship, or charitable organization), concept (e.g., a social networking group, brand, etc.), animal, inanimate object (e.g., a car, aircraft, or tool), or the like. Operation of the system 100 and its respective components 102, 104, 106, are described in further detail below.

In an aspect, the data mining engine 102 obtains input data from one or more designated data sources and supplies the obtained data as input text sources to the slotting component 104. In general, the data sources utilized by the data mining engine 102 can include public sources of information as well as private sources of information to which the data mining engine 102 has been permitted to access. Public sources can include third-party sources of articles (e.g., websites, blogs, newspapers, magazines, etc.) and/or public records databases (e.g., court proceedings, property records, credit ratings and/or other ratings bureau records, or the like). Public sources can also include social media websites and/or applications such as Facebook, Myspace, openSocial, Friendster, Bebo, hi5, Orkut, PerfSpot, Yahoo! 360, LinkedIn, Twitter, Google Buzz, Google+, Instagram, Pinterest, Really Simple Syndication (RSS) readers, and/or any other websites and/or applications either presently existing or developed in the future. The data mining engine 102 can also or alternatively access first-party data stores and/or databases, such as internal databases containing relationship information about users of one or more applications with which the data mining engine 102 is associated (e.g., databases of addresses, legal records, transportation passenger lists, gambling patterns, political and/or charity donations, political affiliations, vehicle license plate or identification numbers, universal product codes, news articles, business listings, and hospital or university affiliations). In one example, first-party information can be collected and maintained with the consent of the associated users according to a privacy policy or other suitable set of terms. In addition to and/or in place of the above, the data mining engine 102 can search and/or otherwise utilize data corresponding to any other sources and/or segments of text accessible by the data mining engine 102.

The data mining engine 102 can obtain input sources in various ways. For instance, the data mining engine 102 can incorporate a web crawler or other mechanism to obtain data from various networks and/or network sites, such as social media sites, public records sites, or the like, at periodic or non-periodic intervals. As another example, the data mining engine 102 could utilize a search engine or other tool to obtain information relating to specific subjects (e.g., entity names/identities, fields/areas of business, geographic areas, etc.) at periodic or other suitable intervals.

Data mining can be performed by the data mining engine 102 in a general manner on classes of information sources, or alternatively arguments and/or other constraints can be provided to obtain sources deemed to be more relevant to a particular entity and/or set of entities. As an example, the data mining engine 102 can be configured to search state bar membership records when searching for information on lawyers and/or law firms and to skip searching such records otherwise. Other similar examples are also possible.

In an aspect, the slotting component 104 receives input text sources obtained by the data mining component 102 as described above and parses and/or otherwise scans those sources for identified entities. Upon finding an identified entity, the slotting component 104 can create a record for that identity to which characteristics and/or other facts associated with the identified entity can be slotted or otherwise associated.

In one example, the slotting component 104 is configured to search for specific identities that are provided to the slotting component 104 as input, e.g., either as explicit input or based on entities already represented in the entity data structure 110. Also or alternatively, the slotting component 104 can be configured to automatically detect entities in input text sources. This can be done, e.g., via a text parsing algorithm or other suitable means, which may be trained via machine learning or other suitable techniques.

Figure 2:
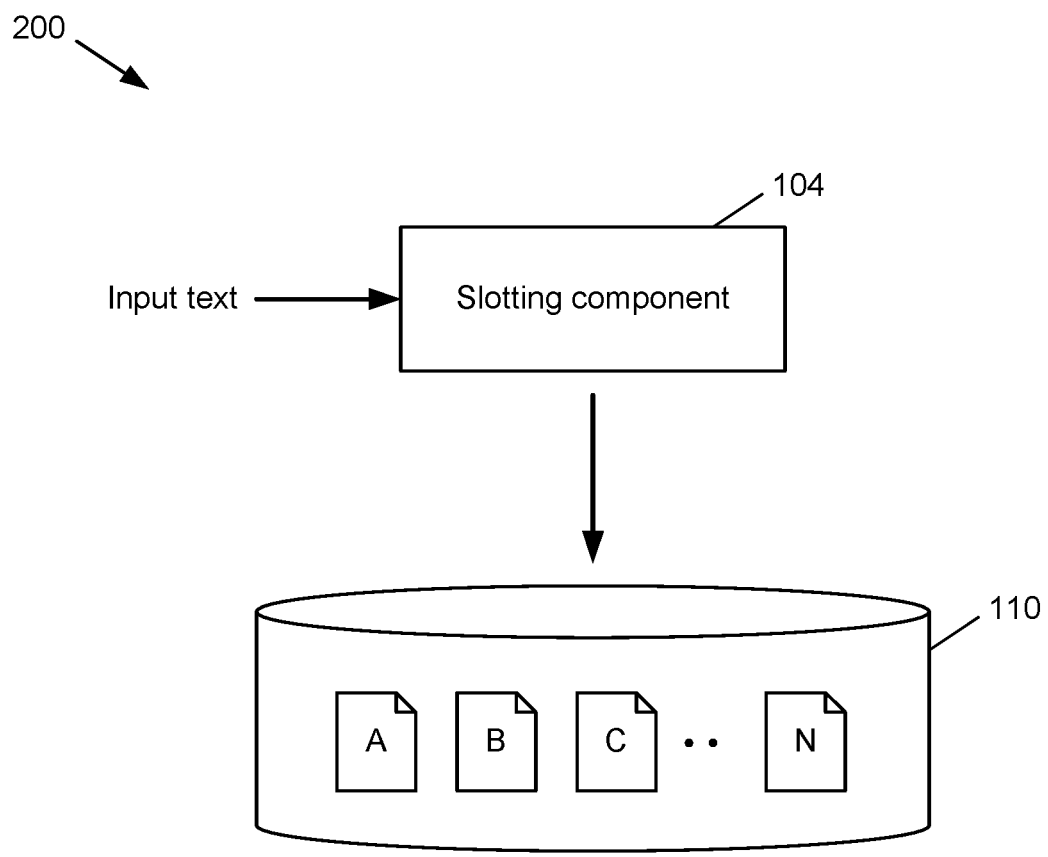
FIG. 2 is a diagram illustrating example slotting operations that can be performed by the system of FIG. 1.

The entity data structure 110 can be any type of data structure that is suitable for storing and maintaining information for respective entities. The data structure 110 could be, for instance, a database, a hash table or tree, a linked list, etc. In an aspect, records in the entity data structure 110 are maintained for respective entities identified in a text source via a slotting phase and a merging phase. In the slotting phase, the slotting component 104 creates new records in the entity data structure 110 corresponding to each identity given in the text source. For instance, in the example shown by diagram 200 in FIG. 2, the slotting component 104 creates records in the entity data structure for N identities found in the associated input text. The slotted identities can each be distinct identities, such that the slotting component 104 maintains a listing or other representation of the entities identified in a given text input and slots each instance of respective identities into the appropriate record(s). Alternatively, separate records can be maintained for each instance of an identity in the input text, and these records can later be passed to the record merging component 106 to be combined as appropriate in the manner described below.

In general, the slotting component 104 parses and/or otherwise analyzes text sources given by the data mining engine 102 for any characteristics of respective entities during the slotting phase. As used herein, a "characteristic" of an entity refers to any facts and/or other information relating to an entity. Characteristics of an entity could include, but are not limited to, an entity's name or alternate identifiers, biographical information, organizational information, family information, member or employment information, financial information, social media connections and/or other social connection data, court records, property records, group/demographic information, and so on. Alternate identifiers for an entity could include, e.g., aliases, alternate business names, online handles, etc. Biographical information for an entity (e.g., a person) could include, e.g., place/date of birth, physical characteristics, information relating to an entity's spouse, children or other family members, etc. Organizational information (e.g., for a corporation or other organization) could include, e.g., principal place of business and/or operation, date/place of founding, corporation or organization type, tax status, etc. Identifiers for an inanimate entity could include year of manufacture or year of initial existence, location, manufacturer or creator, model, value, purchase price or current cost, type of entity, usefulness or aesthetic merits of entity, field of endeavor to which entity is related, etc. The above is not intended as an exhaustive list of characteristics that could be considered by the system 100, and other characteristics could also be used.

In an aspect, the slotting component 104 can determine identities for slotting based on any suitable identifying characteristics for respective entities. An identifying characteristic for an entity can be a name of the entity but could also or alternatively be and/or include other characteristics that could be used to positively identify the entity. For an entity that is a person, these could include, but are not limited to, a birthdate, a residence address, an alias or online handle, identities and/or other identifying characteristics of family members, etc. For an entity that is a business or other organization, these could include, but are not limited to, a date of founding, place(s) of operation, employee information, alternate business names, etc. For an entity that is inanimate, such as a vehicle, these could include, but are not limited to, make, model, year of manufacture, manufacturer, list price, purchase price, current value, features or options, color, engine type, number of passengers, storage space available, owner, rental agency, rental price, mileage, mileage restrictions, etc. For an entity that is inanimate, such as a tool, these could include, but are not limited to, manufacturer, tool type, tool uses, name of tool, year of manufacture, size, weight, color, location, purchase price, rental price, value, etc. For an entity that is inanimate, such as an informal or beliefs-based organization, these could include but are not limited to name, meeting location, office location, meeting dates or frequency, officers, affiliated persons or organizations, beliefs or statement of beliefs, organizational principles or creed, strength of relationships among members, frequency of change of membership, ability to change membership relationship, dues or expected contribution, etc.

As the slotting component 104 creates records in the entity data structure 110 corresponding to identities in a given text source, the slotting component 104 can in some cases associate characteristics of respective identities that are given by the text source with the corresponding records during the slotting phase. For instance, if a text source comprises a social media page of an entity or a similar listing of characteristics that can be definitively linked to a given entity, the slotting component 104 can populate the record for the corresponding entity with those characteristics during the slotting phase. Similarly, if a given source text segment includes references to attributes or characteristics of an identified entity, such as number of children, a spouse or other relative's name, place of employment, past history (e.g., with respect to employment, residence, education, financial, business ownership, etc.), and/or other characteristics, the slotting component 104 can populate a record for that entity with the referenced characteristics. In addition to populating a record for an entity with corresponding referenced characteristics, the slotting component 104 can maintain a tally or other count of the frequency of those characteristics being associated with the entity. By way of specific example, the slotting component 104 can maintain a count of the number of times a workplace is mentioned in relation to a specific entity.

In some cases, the slotting component 104 may determine a probability that a characteristic indicated in a text source belongs to a given entity such that the characteristic is associated with the entity during the slotting phase only if the probability is greater than a threshold. Otherwise, the characteristic could be slotted in a different record to be further analyzed during the merging phase.

Figure 3:
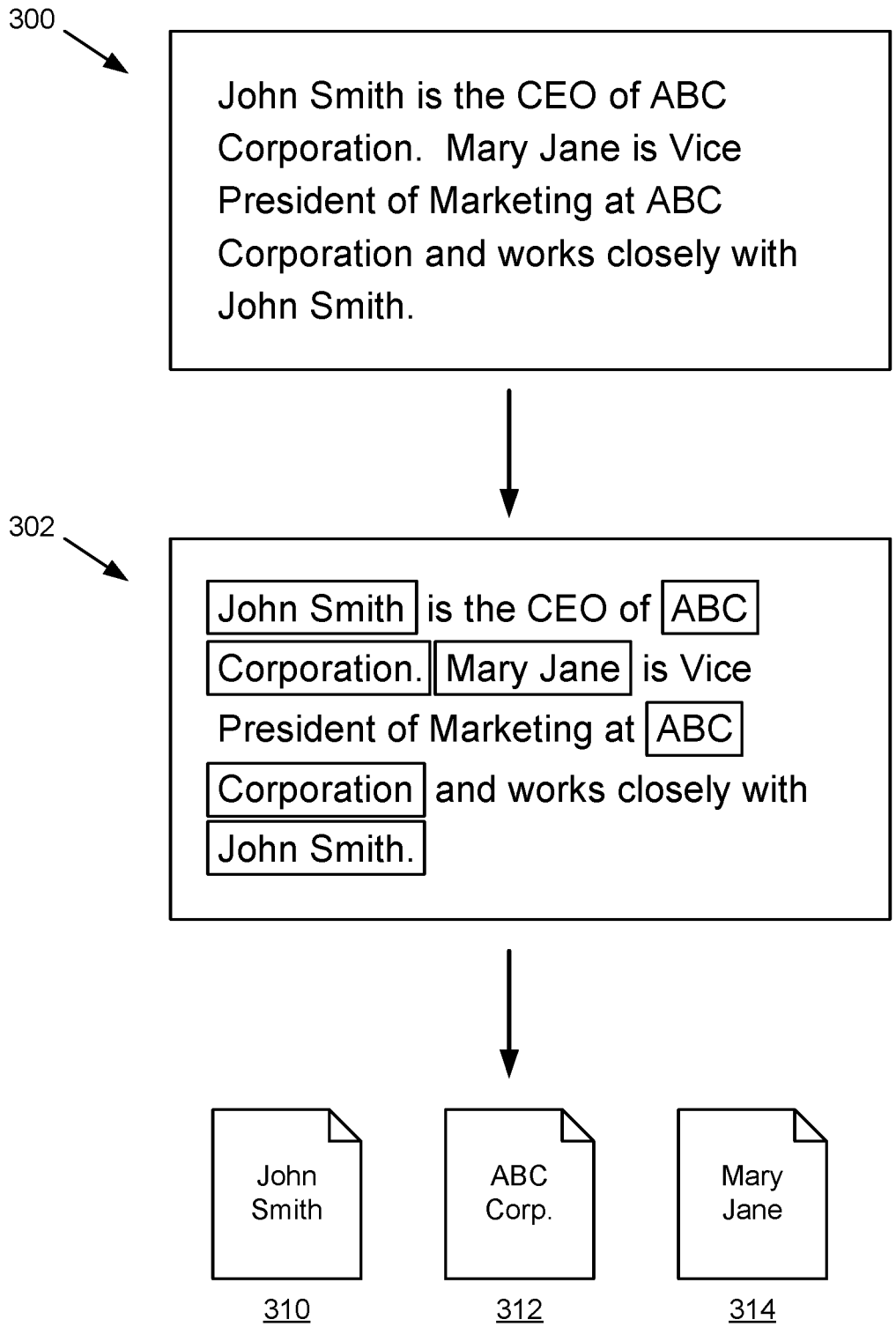
FIGS. 3-5 are illustrative diagrams showing example text parsing and slotting operations that can be performed by the system of FIG. 1.

Turning next to FIG. 3, an example of a text source 300 that can be processed by the slotting component 104 during the slotting phase is illustrated. Here, the text source 300 is a selection from an article, social media post, or other suitable text input. While the text source 300 contains a limited amount of information for simplicity of explanation, it should be appreciated that the text source 300 can be of any suitable size or complexity.

Initially, the slotting component 104 may be configured to detect identified entities in the text source 300. Thus, for instance, as shown in diagram 302, the slotting component 104 identifies instances of John Smith, ABC Corporation ("ABC"), and Mary Jane in the text source 300. The slotting component 104 can find these identities by reference to a preexisting list (not shown); alternatively, the slotting component 104 can be configured to parse a text input to find any named entities in the text.

As further shown in FIG. 3, as a result of parsing the text source 300, the slotting component 104 may create data records 310, 312, 314 for each of the identities found in the text source 300—here, John Smith, ABC Corp., and Mary Jane, respectively. As shown in FIG. 3, the slotting component 104 may be configured to maintain records for each unique entity identified in the text source 300. While not shown in FIG. 3, the slotting component 104 could also maintain tallies and/or other indications of the frequency at which respective entities are mentioned in the text source 300, either in the corresponding records themselves or in a separate data structure. In an alternate example, the slotting component 104 could maintain separate records for each instance of an identified entity in the text source 300. In the example shown by FIG. 3, maintaining separate records would result in two separate records for each of ABC and John Smith.

Figure 4:
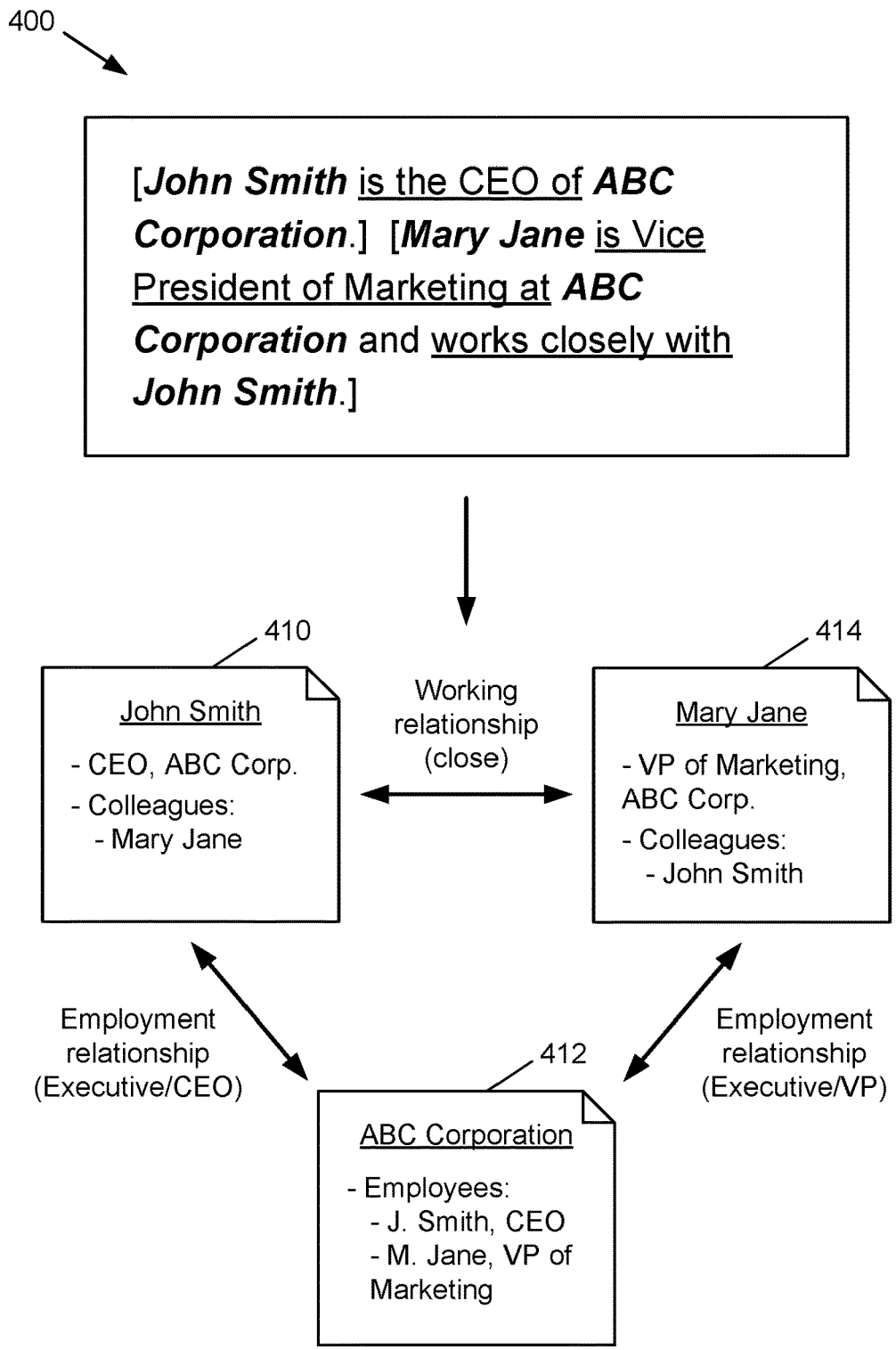

Next, as shown by diagram 400 in FIG. 4, the slotting component 104 can be configured to slot facts relating to the entities identified in the given text source 300. For instance, as shown in diagram 400, the slotting component 104 can further analyze the text source 300 to determine relationships between named entities. Here, for purposes of illustration, named entities are shown with bold text and italics, statements giving a relationship between entities are set off by brackets, and the nature of the corresponding relationship is shown via underlining. It should be appreciated that the text formatting shown in FIG. 4 and the other illustrations provided herein are intended only to provide a visual understanding of the operations performed by the slotting component 104 and need not be actually performed by the slotting component 104 on the underlying text source(s).

In an aspect, based on the initial sentence of the text source, "John Smith is the CEO of ABC Corporation," the slotting component 104 can create records 410, 412 for John Smith and ABC, respectively, in a similar manner to that described above with respect to FIG. 3. In addition to creating the records, the slotting component 104 can note Smith's position as CEO of ABC in both the record for Smith 410 and the record for ABC 412, as further shown by FIG. 4. Also or alternatively, the slotting component 104 can include pointers, relational database keys, or other references between the records 410, 412 for John Smith and ABC, which can specify the nature of the relationship between the entities indicated in the records. For instance, FIG. 4 illustrates that the records 410, 412 for John Smith and ABC can be connected via a reference that specifies Smith as an executive with ABC.

Similarly, based on the second sentence of the text source, "Mary Jane is Vice President of Marketing at ABC Corporation and works closely with John Smith," the slotting component 104 can create a record 414 for Mary Jane and indicate in the record 414 her position with ABC and that John Smith is her colleague. The slotting component 104 then, in turn, can update the records 410, 412 for John Smith and ABC as appropriate. Here, the slotting component 104 indicates Mary Jane as a colleague of John Smith in Smith's record 410 and lists Mary Jane as the Vice President of Marketing in ABC's record 412. In a similar manner to that described above for records 410 and 412, the slotting component 104 can also provide pointers or references between the record for Mary Jane 414 and each of the other records 410, 412 that specify their relationships, e.g., that Mary Jane and John Smith have a close working relationship and that Mary Jane is an executive of ABC.

Figure 5:
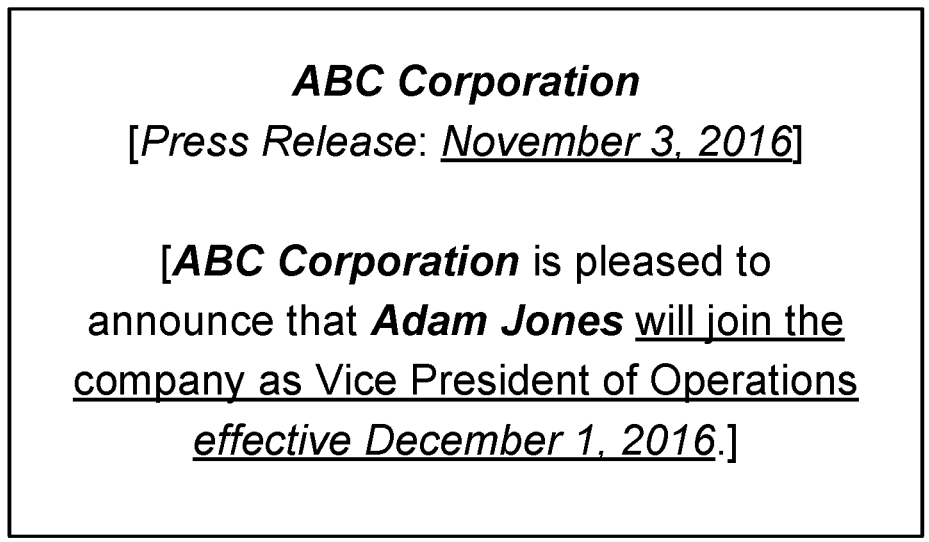
Figure 5:
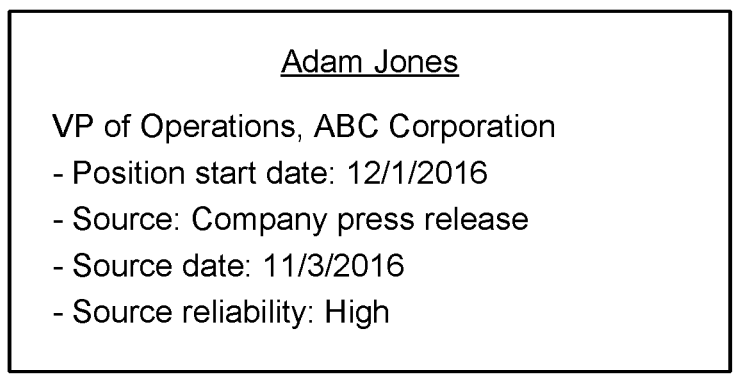

Turning next to FIG. 5, another example slotting phase for a given text source 500 is illustrated. Here, the text source 500 is a press release from ABC Corporation announcing that Adam Jones will join the company as Vice President of Operations effective Dec. 1, 2016. Based on the text source 500, the slotting component 104 can create a record 502 for Adam Jones that indicates his position within ABC Corporation. While not shown in FIG. 5, the slotting component 104 could also create a record for ABC Corporation and link the record for ABC Corporation to the record for Adam Jones in a similar manner to that described with respect to FIG. 4.

In an aspect, the slotting component 104 can include in the record 502 further facts and/or characteristics associated with Adam Jones and/or his position within ABC Corporation. For instance, the slotting component 104 can list the starting date given in the press release in the record 502. In some cases, the slotting component 104 can also make inferences from the available data and slot those inferences as further characteristics. By way of example, if the text source 500 was analyzed after Dec. 1, 2016, the slotting component 104 could calculate the time passed since that date and list this in the record 502 as an estimated length for the position. Other examples are also possible.

As various characteristics are slotted for an entity, the slotting component 104 can also note pertinent details regarding those characteristics, e.g., for evidence purposes. Referring to record 502, the slotting component 104 can note the source of the characteristics given in the record 502 as a corporate press release dated Nov. 3, 2016. Any other details concerning given facts and/or characteristics could also be noted in a corresponding record in a similar manner.

As further shown in record 502, the slotting component 104 can estimate the reliability of the source of a characteristic and note the reliability in the record 502 together with other information about that characteristic. The estimated reliability of a source can be based on, e.g., an age of the source, a type of the source (e.g., a blog post may have less inherent reliability than an official press release), a trust score or other metric associated with the source, and/or some other measure of the reliability of the source. Systems and methods for providing such trust scores and other metrics or measures of the reliability of a source are described in U.S. patent application Ser. No. 13/521,216, published as U.S. Patent Application Publication No. 2013/0173457 A1, which is incorporated herein by reference in its entirety.

In an aspect, the slotting component 104 can utilize one or more data verification processes to estimate and/or otherwise compute the reliability of characteristics or other information relating to a target entity. In some embodiments, a data verification process can include verification of contact information, including, but not limited to, email address, phone number, and/or mailing address. A data verification process can also utilize email, Instant Messaging (IM), and other messaging factors, such as frequency of messages, time of day of messages, depth of thread, or a review of threads for key transaction/activity types (e.g., loan, rent, buy, etc.). Data verification can take into account data from passport and/or other government IDs, tax return factors (e.g., a summary of a tax return to prove income), educational data (e.g., certificates of degree/diploma), group affiliation factors (e.g., invoices that prove membership to a group), achievements (e.g., proof of awards, medals, honorary citations, etc.), employment data (e.g., paystub data), ratings data, publicly available information, location data, social network information, credit scores, available court data, opt-in provided data, transaction histories, trustworthiness evaluations or ratings, trust scores, group/demographic information, reputation, membership, status, and/or influence of the entity in a particular community or in relation to another entity, crowdsourced information, search engine mining, etc. Data verification can also incorporate facial recognition software to verify certain documents, such as IDs. In some embodiments, verification of characteristics and/or other data can be achieved by a document that proves the subject of the data (e.g., a tax return to prove income) or by peer verification. For instance, employment information can be vetted by peers connected to the target entity. In some embodiments, information used for data verification can be deleted or otherwise discarded once the underlying data has been verified. For example, images of passports/IDs, other information that the slotting component 104 does not have permission to retain, or other sensitive information can be deleted once the information contained therein is validated.

Upon estimating the reliability of a given source and/or characteristics noted in that source, the estimated reliability can be noted in relative terms as shown in record 502, e.g., "low", "high", a scaled factor, or the like. Alternatively, a numerical score or other indicator could be used.

Figure 6:
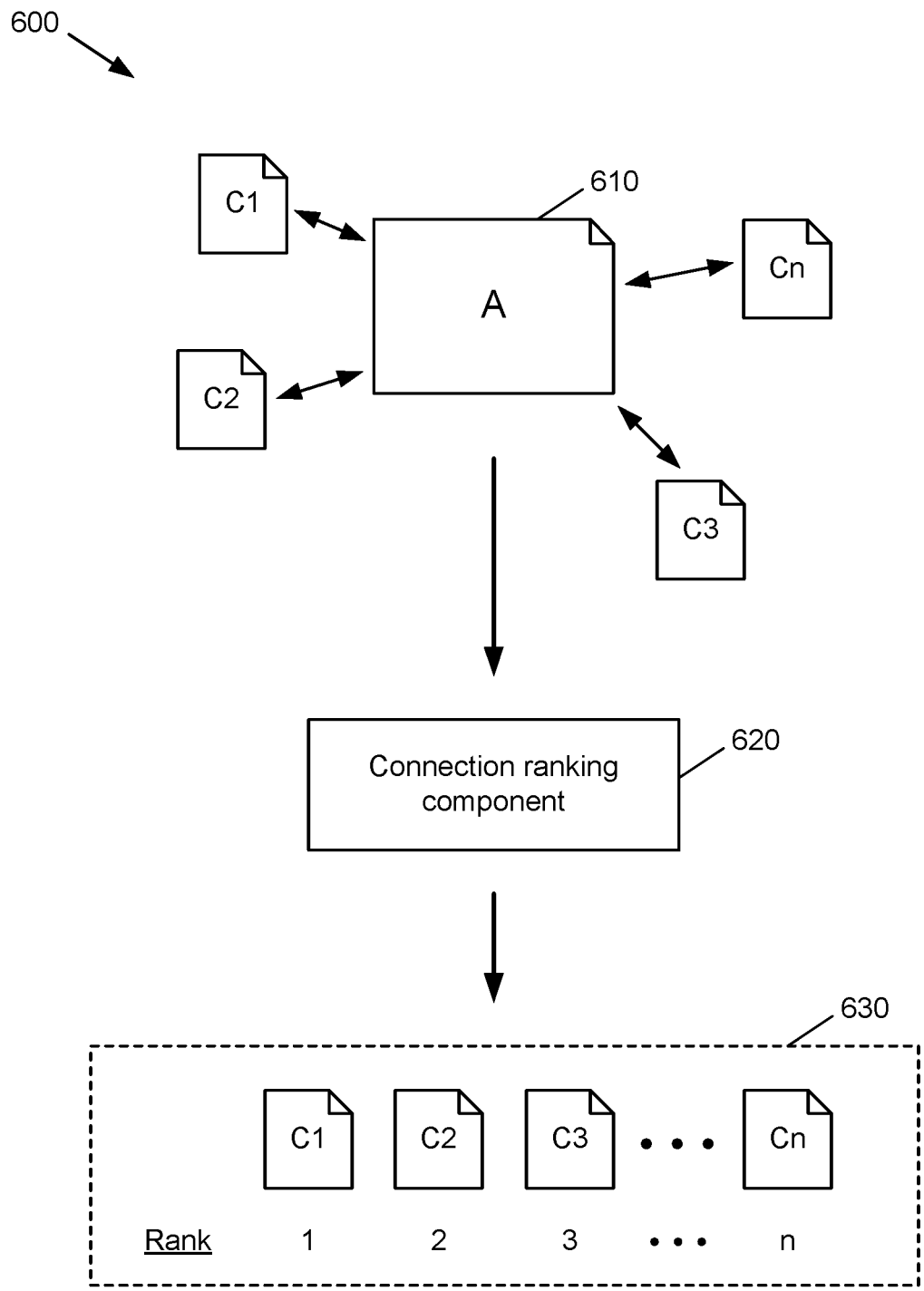
FIG. 6 is a functional block diagram illustrating an example technique for ranking social connections of an entity.

With reference next to FIG. 6, a functional block diagram 600 is provided that illustrates an example technique for ranking social connections of an entity. As described above, the data mining engine 102 and/or slotting component 104 can utilize data from social networking sites and/or other sources to identify entities that are related or otherwise connected to a given target entity. In the example shown in FIG. 6, an entity A (610) is determined to have n connections or relationships C1-Cn. These connections could be family members, friends, co-workers, colleagues, other social connections, and/or entities having any other suitable relationship with entity A. The connections for entity A can be populated in a database record for entity A or otherwise associated with such a record, e.g., as described above with respect to FIG. 4

In an aspect, the connection strength between entity A and those entities C1-Cn marked as relations to entity A can be calculated by a connection ranking component 620, which can be implemented as part of the slotting component 104 or configured to operate in addition to or independently of the slotting component 104. In response to the processing performed by the connection ranking component 620, a ranked list 630 of the connections of entity A is produced, as described below. Systems and methods for evaluating the connection strength between various entities are described in U.S. patent application Ser. No. 15/055,952, which is incorporated herein by reference in its entirety.

In one example, the connection ranking component 620 can operate based on data obtained from a social network (e.g., Facebook, Twitter, Instagram, Pinterest, LinkedIn, etc.). It should be appreciated, however, that any text input specifying a relationship between entities could be used as the basis for populating an entity record with data relating to that entity's connections.

In an aspect, the connection ranking component 620 can calculate connection strength between an entity and those marked as relations to that entity. For instance, in a case where Mary Smith works at ABC Corporation and her supervisor is Jane Kennedy, the connection ranking component 620 can utilize factors such as how long the two have worked together, how many layers, intermediate connections, or the like exist between Mary and Jane, how many other reports Jane has in addition to Mary, etc., to calculate a connection strength and assign that connection strength between Mary and Jane. Other connection strength factors that can be used by the connection ranking component 620 include, but are not limited to, familial relations (e.g., siblings, first cousins, etc.), relationship length (e.g., amount of time respective entities have been friends, colleagues, etc.), shared work history, frequency at which the relationship is mentioned in the various data sources acquired by the data mining engine, and the like.

Additionally or alternatively, evidence of interactions between entities on social networking services and/or other media can be utilized by the connection ranking component 620 in determining connection strength. Interactions utilized in such a determination can include bilateral (two-way) interactions between entities as well as unilateral (one-way) interactions from an entity to a connection of that entity. Examples of bilateral interactions include email, SMS, or instant messaging (IM) exchanges, records of transactions conducted between the relevant parties, submission and acceptance of a "friend request" or other similar mechanism that initiates connection between two parties, or the like. Examples of unilateral interactions include interactions by an entity with a post made by another, such as indicating a reaction or "like" in response to the post, commenting on the post, sharing the post, etc. Further examples of unilateral interactions include an entity connecting to another via a mechanism that does not require approval by the other party, such as a "follow," "like," and/or other such mechanism utilized by a given social networking service. The nature of these interactions, as well as the frequency of such interactions, can be utilized in determining the strength of a corresponding connection.

In an aspect, the connection strength between two entities can be adjusted upwards or downwards depending on the type of interaction between the entities and the result of the interaction. For example, each simple email exchange between two entities can automatically increase or decrease the connection strength between those entities. More complicated interactions (e.g., product or service sales or inquiries) between two entities can increase or decrease connection strength by some larger fixed amount. In some embodiments, an interaction between two entities can increase corresponding connection strength unless an entity indicates that the interaction was unfavorable, not successfully completed, or otherwise adverse. For example, a transaction may not have been timely executed or an email exchange may have been particularly displeasing.

In further cases, whether an interaction is favorable or adverse can be determined based on the context of the interaction. For instance, a first entity could share a posting or other information originating from another entity with editorial comments regarding the first entity's opinion of the information and/or the entity from which it originated, e.g., "this is a brilliant idea," "look at how dumb this is," etc. As another example, known characteristics of a given entity can provide context for an interaction. For instance, if an entity follows a politician on a social media service, the connection ranking component could compare the political affiliation of the entity (if known) to that of the politician to determine whether and to what extent that interaction is positive or negative (e.g., if the entity and politician are similar in political views the interaction can be regarded as positive, otherwise the interaction can be regarded as neutral or negative).

In an aspect, a connection between two entities can be classified as friendly or positive, in which case adverse interactions can automatically decrease connection strength while all other interactions can increase user connectivity values (or have no effect). Alternatively, a connection between two entities can be classified as adversarial and/or otherwise negative, in which case adverse or negative interactions can increase connection strength while favorable or positive interactions can either reduce connection strength or have no effect. In either case, both friendly and adversarial relationships can be examined and ranked by the connection ranking component 620, either separately or together (e.g., by comparing absolute connection strengths regardless of the nature of the corresponding connections).

In another aspect, the connection ranking component 620 can construct and/or otherwise utilize a network graph for use in ranking connections of an entity. The network graph can comprise nodes and edges or paths that represent connections between respective nodes. The term "node," as used herein, includes an entity as described above and/or any user terminal, network device, computer, mobile device, access point, or any other electronic device which may be associated with one or more entities.

In one example, a network graph can represent a network that connects a requesting entity and a target entity. One or more intermediate nodes may also be present, as well as paths the requesting entity, target entity, and/or intermediate nodes. In some embodiments, a dominant path between the nodes of the graph can be determined using any suitable algorithm. For example, the dominant path may represent the shortest-length path between two given nodes. In other embodiments, the dominant path can represent a path through specific intermediate nodes, such as nodes corresponding to relatively highly trusted entities. Systems and methods for providing network graphs, such as social graphs, are described in U.S. patent application Ser. No. 13/695,419, published as U.S. Patent Application Publication No. 2013/0166601 A1, which is incorporated herein by reference in its entirety.

Connectivity may be determined via the network graph, at least in part, using various graph traversal and normalization techniques. For instance, a path counting approach can be used wherein processing circuitry is configured to count the number of paths between a first node and a second node within a network community. A connection strength can then be assigned to the nodes. The assigned connection strength can be proportional to the number of subpaths, or relationships, connecting the two nodes, among other possible measures. Using the number of subpaths as a measure, a path with one or more intermediate nodes between the first node and the second node may be scaled by an appropriate number (e.g., the number of intermediate nodes) and this scaled number may be used to calculate the connection strength.

In some embodiments, weighted links are used in addition to or as an alternative to the subpath counting approach. Processing circuitry may be configured to assign a relative user weight to each path connecting a first node and a second node within a network community. A connection strength may be assigned to each link. The link values assigned by a particular user or entity may then be compared to each other to determine a relative user weight for each link.

To determine path connectivity values, in some embodiments, a parallel computational framework or distributed computational framework (or both) may be used. For example, in one embodiment, a number of core processors implement an Apache Hadoop or Google MapReduce cluster. This cluster may perform some or all of the distributed computations in connection with determining new path link values and path weights.

In some embodiments, to improve performance, paths may be grouped by the last node in the path. These path groups may then be stored separately (e.g., in different columns of a single database table). In some embodiments, the path groups may be stored in columns of a key-value store implementing an HBase cluster (or any other compressed, high performance database system, such as BigTable).

In some embodiments, one or more threshold functions may be defined. The threshold function or functions may be used to determine the maximum number of links in a path that will be analyzed in a connectivity computation. Threshold factors may also be defined for minimum link weights, path weights, or both. Weights falling below a user-defined or system-defined threshold may be ignored in a connectivity computation, while only weights of sufficient magnitude may be considered.

Figure 7:
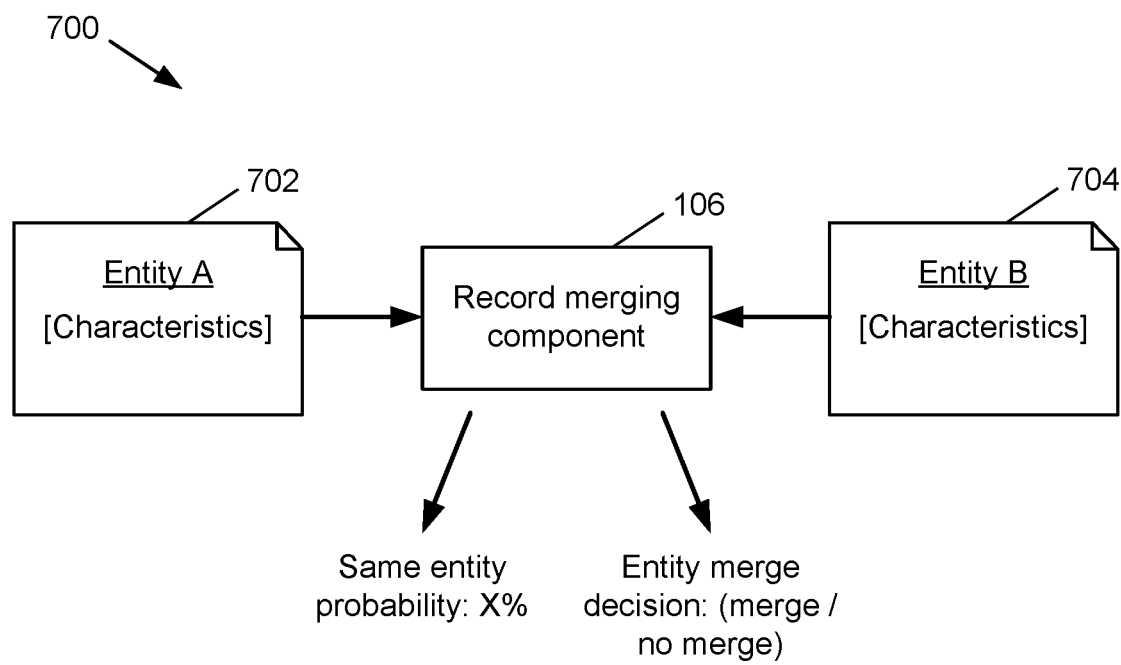
FIG. 7 is a functional block diagram illustrating an example technique for identity matching and database record merging.

Referring next to FIG. 7, a diagram 700 is provided that illustrates example operation of the record merging component 106. As described above, the slotting component 104 populates respective records of an entity data structure 110 with information relating to entities identified in text sources provided by the data mining engine 102. The record merging component 106, in turn, compares records populated by the slotting component 104 to determine the likelihood that respective records correspond to a common entity. If the record merging component 106 determines that a set of records correspond to the same entity, the set of records are combined into a single, merged record.

In an aspect, slotting and merging can occur in two distinct phases—a slotting phase in which data sources are analyzed and records are initially populated, and a merging phase in which the records generated during the slotting phase are combined as appropriate. Alternatively, slotting and merging can occur together in a single phase. For instance, in response to the slotting component 104 generating an entity record from a given text source, the record merging component 106 can merge the generated record with other records in the data structure 110 as appropriate even while the slotting component 104 generates records for other entities.

As shown in FIG. 7, the record merging component can operate with respect to a pair of entity records 702, 704 corresponding to entities A and B, respectively. While FIG. 7 and the following description relate specifically to pairwise comparison and merging, the record merging component 106 can be configured to compare and/or merge any appropriate number of records.

In an aspect, the record merging component 106 compares respective characteristics indicated in the entity records 702, 704 to determine to what extent, if any, the respective characteristics refer to the same entity. As shown in FIG. 7, the record merging component 106 can compute an identity probability, which may be a percentage and/or other metric indicating the probability that entities A and B are the same entity. Based on this identity probability, the record merging component 106 can, as appropriate, either merge records 702, 704 or leave records 702, 704 as distinct records. In one example, a decision to merge a pair of records can be made by comparing an identity probability for the pair of records to a threshold, where the records are merged if the identity probability is higher than the threshold and not merged otherwise.

Turning to FIGS. 8A-8B, example operation of the record merging component 106 is illustrated with respect to two records 800, 802. As shown in FIG. 8A, records 800 and 802 are associated with an entity named John Smith and list respective facts or characteristics associated with that person. In this example, the facts include birthdate, children, and current employment, although other facts could be used. Additionally, each record 800, 802 is associated with the source of the information populated in the record, and a relative reliability for each fact populated in the records 800, 802 is listed along with the corresponding records. A textual reliability score (e.g., "certain," "very high," "high," "low," etc.) is used in FIG. 8A, although other metrics, such as a percentage or other numeric score, could be used In an aspect, reliability scores for respective characteristics populated in a record can be based on any factors deemed by the slotting component 104 as potentially indicative of the reliability of the corresponding characteristics. These can include, but are not limited to, age of the input data, reliability of the input data, frequency of the corresponding characteristic appearing in the input data, the type of the underlying characteristic (e.g., some characteristics, such as one's birthdate, credit score, or the like, could be considered more reliable than other characteristics), etc.

As shown in records 800, 802, respective characteristics have reliability scores ranging from "high" to "certain." In an aspect, a reliability score of "certain" can be given to a characteristic that is independently verified, e.g., based on a driver's license, passport, or other identifying documentation for an entity, facial recognition or biometric identification, peer vetting, or the like, and/or otherwise determined to be accurate with substantially complete certainty. An independently verified characteristic can be indicated as such in addition to, or in place of, a reliability score for that characteristic. Other reliability scores can be assigned as generally described above.

Based on the records 800, 802 and their respective populated characteristics, the record merging component 106 can tally or otherwise compare similar facts per entity to determine a probability percentage of the records 800, 802 corresponding to the same entity. In one example, respective facts or characteristics are weighted according to their reliability scores, types, and/or other criteria. For instance, identifying information for an entity that is fixed or otherwise not expected to change significantly over time, such as an entity's name or birthdate, can be given a higher weight than other characteristics irrespective of reliability scores assigned to those characteristics.

Regardless of the weights or other comparison criteria used, the record merging component 106 can consider some or all of an entity's characteristics in determining similarity between records. For instance, while the record merging component can increase an identity probability for two records associated with an entity of the same name, it can be appreciated that different entities may share the same name, or an entity may be associated with more than one name (e.g., a person with maiden and married names, a business operating under multiple names, a person utilizing aliases, pennames or pseudonyms, etc.). Further, it can be appreciated that some text sources may not refer to an entity by name but nonetheless provide information regarding that entity. For instance, a text source may state that "the CEO of ABC Corporation has relocated to ABC's Los Angeles office." While the name of the CEO is not mentioned in the source, a record for the CEO may nonetheless be generated by the slotting component 104, and the identity of the CEO can be inferred by the record merging component 106 based on other characteristics given in the source, e.g., that as of the date of the source the entity is the CEO of ABC Corporation and that the entity's current location is in or near Los Angeles.

When records for entities having similar names and/or other characteristics are created, the record merging component 106 can examine factors such as, for human entities, where the entities live, where they work, their affiliations, age ranges, gender, educational background, relatives, family demographics, etc., and assign an identity probability, for example, a proportion of the extent of similarity between the various stored entities in these characteristics. It can be appreciated that some characteristics will remain similar in different records while others will vary and be entirely different for differing types of entities. For instance, as shown in records 800, 802, John Smith's name and birthdate are the same in both records 800, 802 while his children and employer have changed from the time of the first record 800 to the time of the second 802. In this case, the record merging component 802 can be configured to identify consistencies between information in respective records that accounts for time differentials between the records. In the example shown in FIG. 8A, John Smith is listed in record 800 as having two children in March 2013—Adam, age 3, and Betty, age 5. In April 2016, John Smith is listed in record 802 as having three children—Adam, age 6, Betty age 8, and Corey, age 12 months. As approximately three years have passed between the time indicated in the records 800, 802, and Adam and Betty are indicated to be three years older in the latter record 802, the record merging component 106 can determine that the records 800, 802 are consistent with respect to John Smith's children.

In an aspect, the record merging component determines an identity probability for records 800, 802 based on its comparison of the characteristics populated in the respective records 800, 802. If the records 800, 802 are determined to be sufficiently similar (e.g., the determined probability is at least a threshold), the records 800, 802 are merged and the facts contained therein are combined into one merged entity. FIG. 8B shows a merged record 810 that can be created by the record merging component 106 from records 800 and 802. The merged record 810 lists as its date the date of the most recent constituent record, here April 2016. In one example, the facts populated in the merged record 810 are a union of the facts populated in each of the records 800, 802. Where each of the records 800, 802 have the same field, the record merging component 106 can use the most recent field value, as shown by the birthdate and children in the merged record 810. Additionally or alternatively, the record merging component can make inferences regarding common fields and populate the field with inferred and/or historical data. For instance, the merged record 810 lists XYZ Corporation as John Smith's current employer and ABC Corporation as his former employer of two years, based on the employment information provided in each of the records 800, 802 and their corresponding dates.

In addition to entity characteristics, the merged record 810 can be further populated with data relating to merging and/or other maintenance of the record. For instance, as shown by merged record 810, a listing of previous record merges can be provided along with their dates and/or their corresponding identity probabilities. Other information can also be provided.

While merged record 810 is illustrated as separate from either of records 800 or 802 for simplicity of explanation, the record merging component 106 can merge records in any suitable manner. For instance, if a newly created record is found to refer to a similar entity as a previous record, the previous record can be updated with one or more characteristics from the new record, and the new record can then be discarded, or vice versa.

In another aspect, social connections and/or other relationships associated with respective entities and/or their weights or rankings, as determined as described with respect to FIG. 6 above, can additionally be used to compare respective records for similarity. For instance, as the connection strength for each relationship of an entity is calculated, that relationship and its strength is documented in the record. A full ranking may be populated in the record or a partial ranking (e.g., a ranking of the entity's top N connections). Subsequently, when a similar record is found, the top connections of the respective records are compared. If the connection rankings in both records are the same or substantially similar, the record merging component 106 can determine with a high probability that the entities indicated in the records are the same entity and that the records are candidates for merging.

In a further aspect, an entity data structure 110 created and maintained as generally described herein can be utilized as, or as a part of, an identity matching system and can be configured for various uses. For instance, the entity data structure 110 can be utilized as a reference for a system that maintains and/or otherwise manages trust scores and/or other similar metrics for respective entities. In such an implementation, entity characteristics populated within the respective records of the entity data structure 110 can be used as the basis to calculate a trust score for a corresponding entity and/or another general indication of the entity's trustworthiness. A trust score computed in this manner can be a singular value or part of a larger computation. For instance, an entity could be associated with multiple trust scores (e.g., a system trust score, a peer trust score, and a contextual trust score, etc.), each of which may be computed based on different data sets that could include the entity data structure 110 and/or other suitable data. In another example, the entity data structure 110 could be utilized by private investigators, law enforcement agencies, and/or other persons or organizations tasked with locating a given entity. As records in the entity data structure 110 are maintained according to wide sets of characteristics, similarities in information corresponding to an entity could be leveraged to positively identify a target entity even in the presence of missing, inconsistent, or false names or other identifiers.

Figure 9:
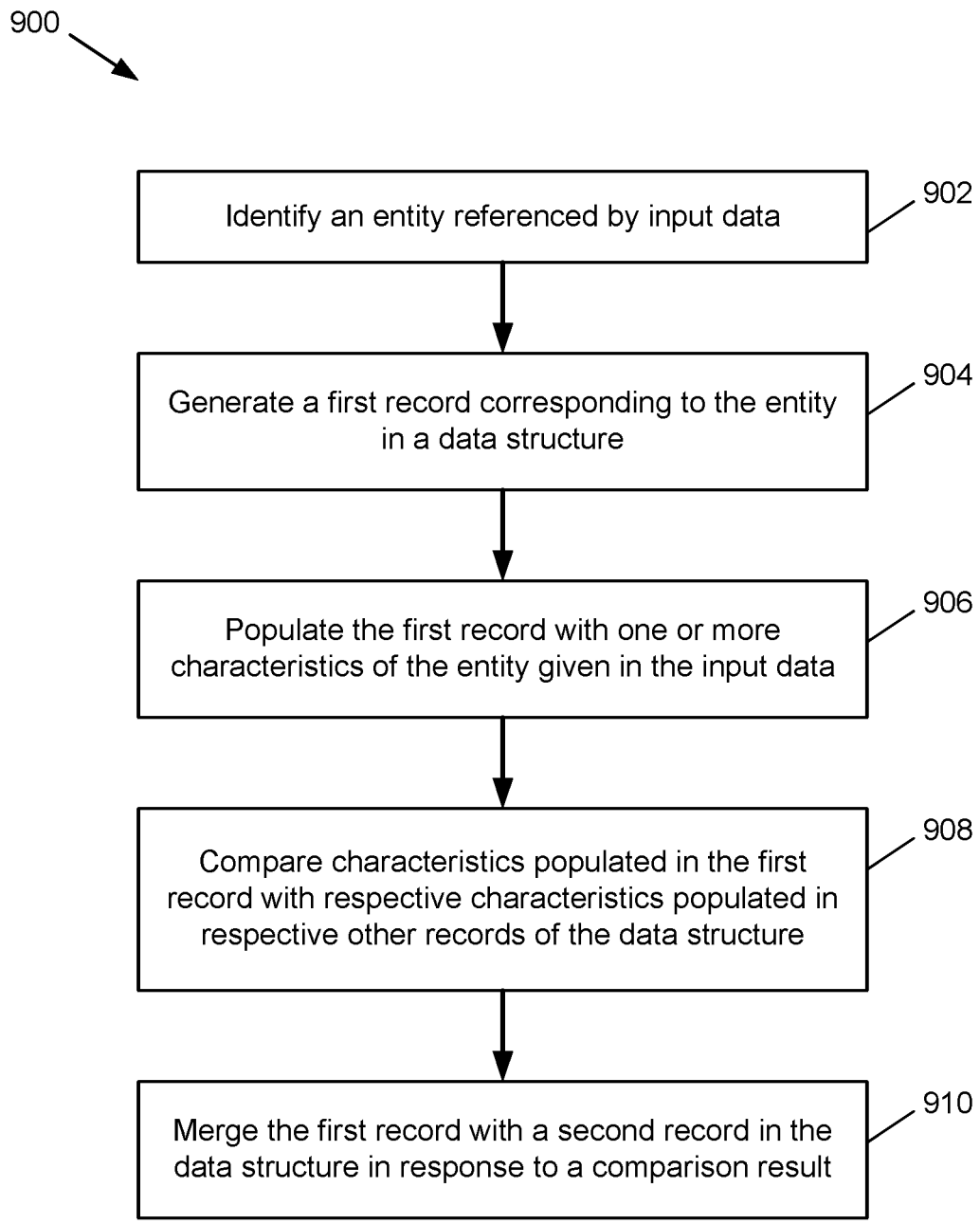
FIG. 9 is a flow diagram of a process for managing data relating to an entity.
Figure 10:
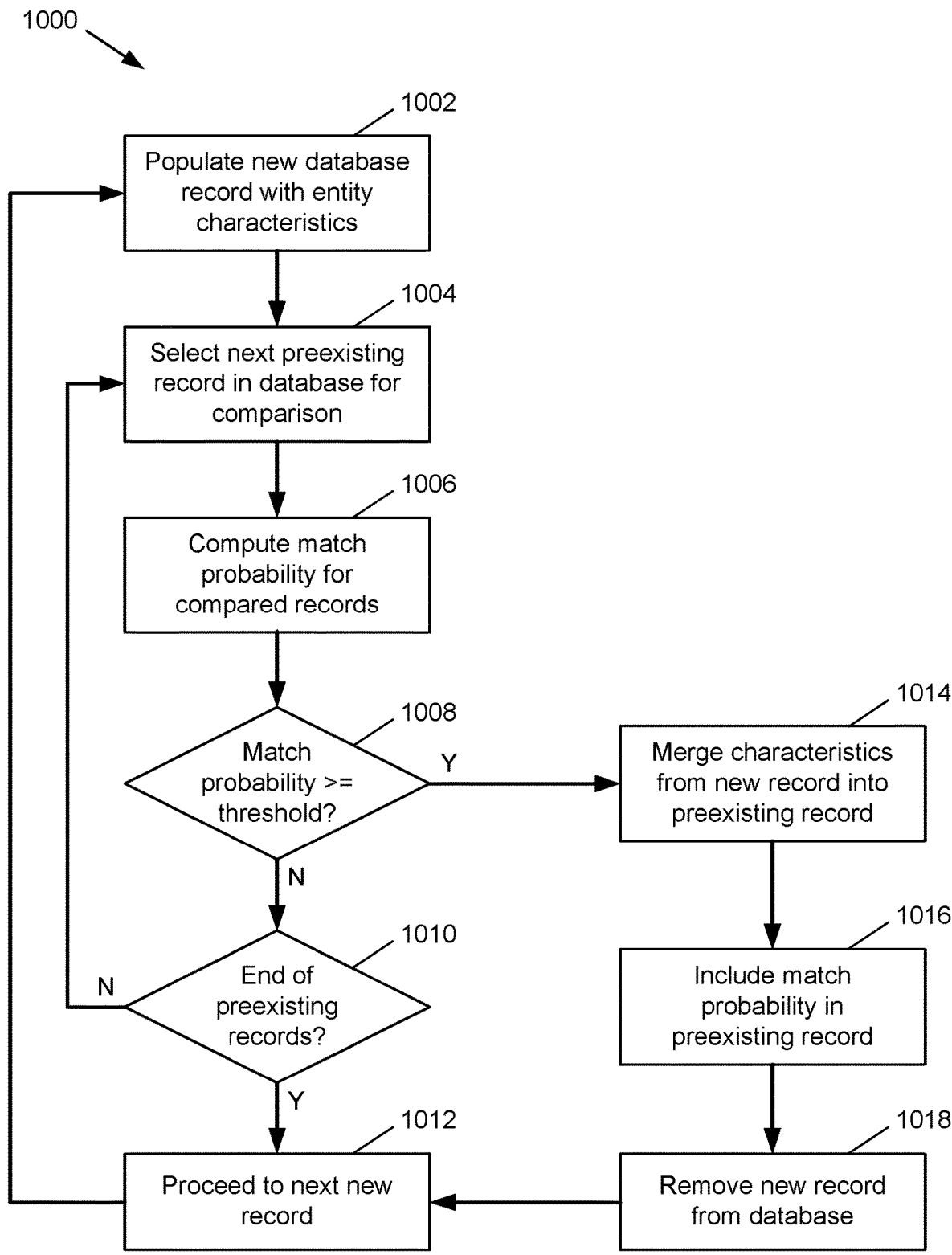
FIG. 10 is a flow diagram of a process for populating and merging database records corresponding to an entity.
Figure 11:
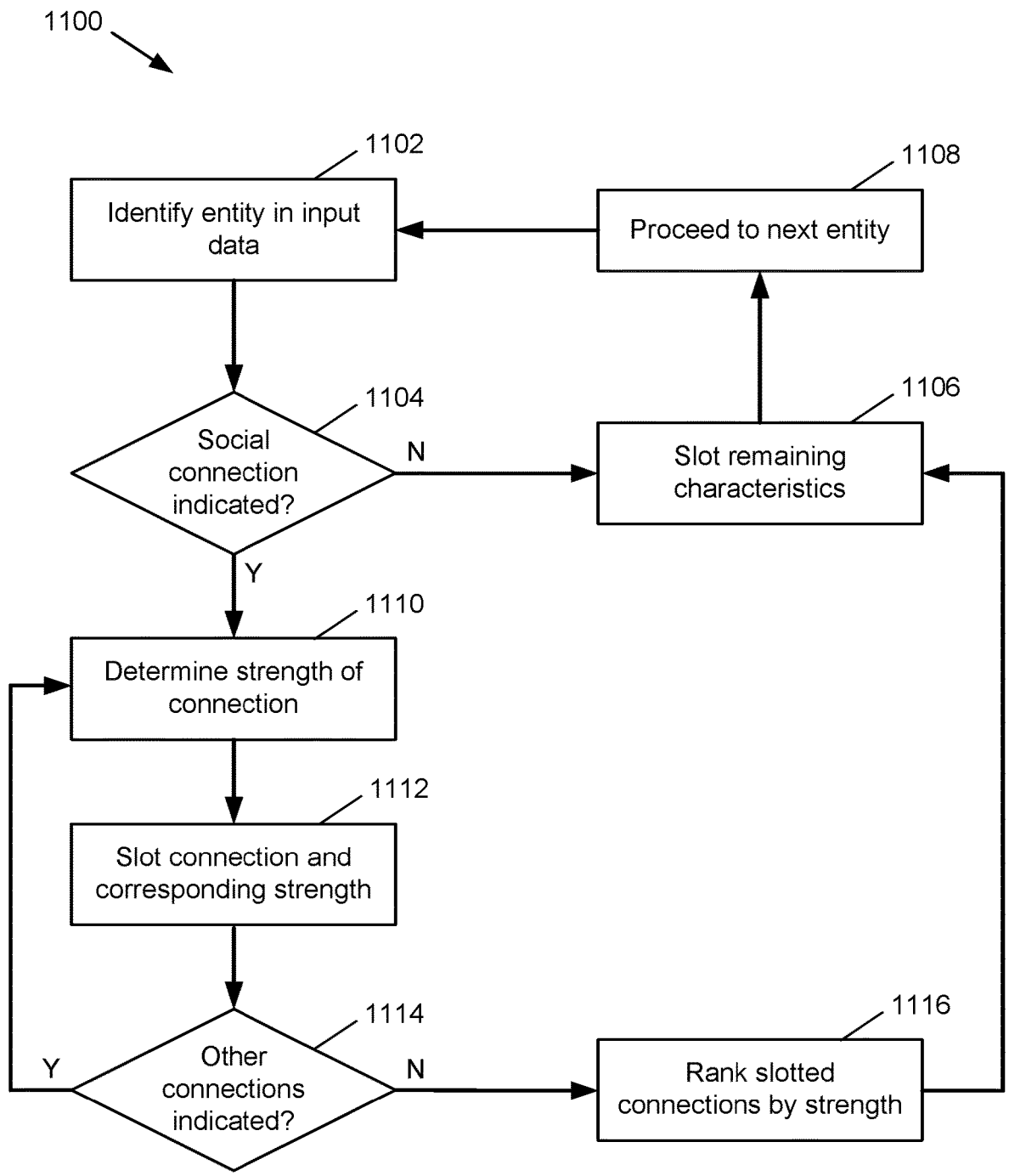
FIG. 11 is a flow diagram of a process for identifying and ranking social connections of an entity.

FIGS. 9-11 illustrate respective methods in accordance with certain aspects of this disclosure. While, for purposes of simplicity of explanation, the methods are shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 9, presented is a flow diagram of an exemplary process 900 for managing data relating to an entity. At 902, an entity referenced by input data (e.g., input text sources obtained by the data mining engine 102) is identified, e.g., by the slotting component 104 and/or other suitable means. At 904, a first record corresponding to the entity is generated in a data structure, e.g., the entity data structure 110. At 906, the first record, i.e., the record generated at 904, is populated with one or more characteristics of the entity that are given in the input data examined at 902. At 908, characteristics populated in the first record are compared (e.g., by the record merging component 106) with respective characteristics populated in respective other records of the data structure. At 910, the first record is merged with a second record in the data structure, e.g., a record examined at 908, in response to a result of the comparison at 908. For instance, as described above, merging can occur as described at 910 upon determining that the first and second records exhibit at least a threshold degree of similarity.

Turning to FIG. 10, a flow diagram of an exemplary process 1000 for populating and merging database records corresponding to an entity is illustrated. At 1002, a new database record (e.g., a record or other suitable grouping of information in the entity data structure 110) is populated with characteristics of an entity, e.g., by the slotting component 104 based on input received from the data mining engine 102.

At 1004, a preexisting record in the database is selected for comparison to the record populated at 1002. At 1006, a match probability is computed for the record populated at 1002 and the record selected at 1004. If, at 1008, the match probability computed at 1006 is not at least a threshold probability, the process 1000 proceeds to 1010 to determine if further preexisting records exist in the database. If the end of the preexisting records in the database has been reached, the process proceeds to 1012 and a new record (e.g., a record or other grouping of information corresponding to another entity referenced in input data) is generated. Subsequently, the process 1000 returns to 1002 to populate and potentially merge the new record.

Alternatively, if it is determined at 1008 that the record populated at 1002 and the record chosen 1004 do exhibit at least a threshold match probability, the process 1000 proceeds to 1014, where the characteristics of the record populated at 1002 are merged (e.g., by the record merging component 106) into the preexisting record chosen at 1004. Additionally, at 1016, the match probability computed at 1006 is included in the preexisting record. After the merging operations performed at 1014 and 1016 are complete, the record populated at 1002 is subsequently removed from the database at 1018. The process 1000 then proceeds to 1012 to generate a new record and to 1002 to populate the new record as described above. In the alternative, the process of merging could move the information from a preexisting record into the new record populated at 1002 and remove the preexisting record from the database at 1018.

Referring next to FIG. 11, a flow diagram of an exemplary process 1100 for identifying and ranking social connections of an entity is provided. At 1102, an entity indicated in input data is identified (e.g., by the slotting component 104 from data provided by the data mining engine 102). At 1104, a determination is performed as to whether the input data examined at 1102 indicates social connections of the entity. If no social connections are indicated, the process 1100 proceeds to 1106 to slot the remaining characteristics of the entity and to 1108 to proceed to the next entity indicated in the input data.

If, alternatively, a social connection is indicated at 1104, the process 1100 proceeds to 1110 and the strength of the indicated social connection is determined (e.g., by the connection ranking component 620). At 1112, the connection indicated at 1104 and its strength as determined at 1110 is slotted, e.g., into a record or other data structure corresponding to the entity. If, at 1114, other social connections are indicated in the input data, the process 1100 returns to 1110 to process the remaining connection(s). If no further connections are present, the process 1100 proceeds to 1116 to rank the connection(s) slotted at 1112 by their determined strengths. Subsequently, as above, the process 1100 returns to 1106 to slot any remaining characteristics indicated in the input data and then to 1108 to obtain the next entity identified in the input data. Such processing may occur serially or in parallel on multiple processors of a device or devices having parallel processing capabilities.

Figure 12:
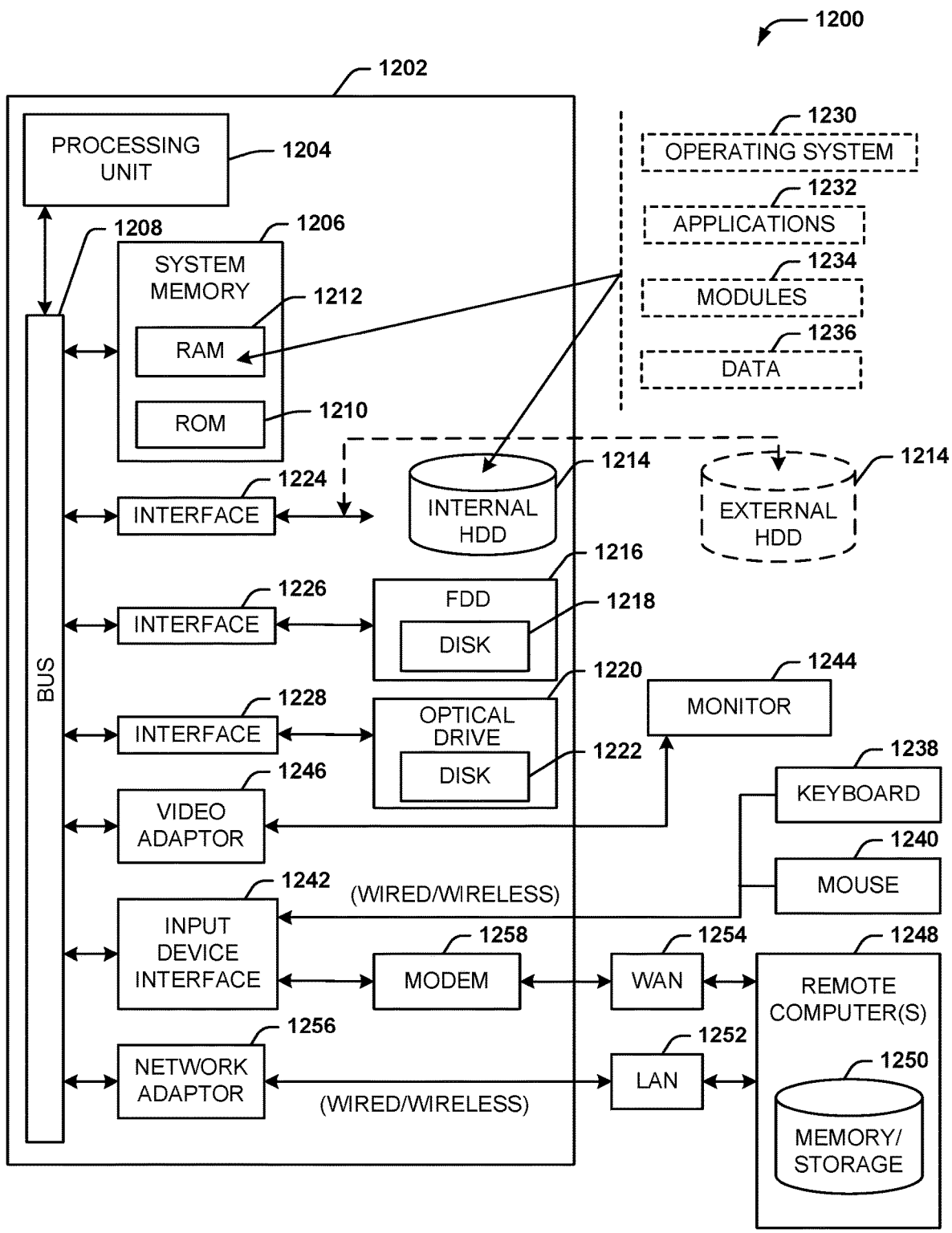
FIGS. 12-14 are block diagrams of respective example computing architectures in which various embodiments described herein can function.
Figure 13:
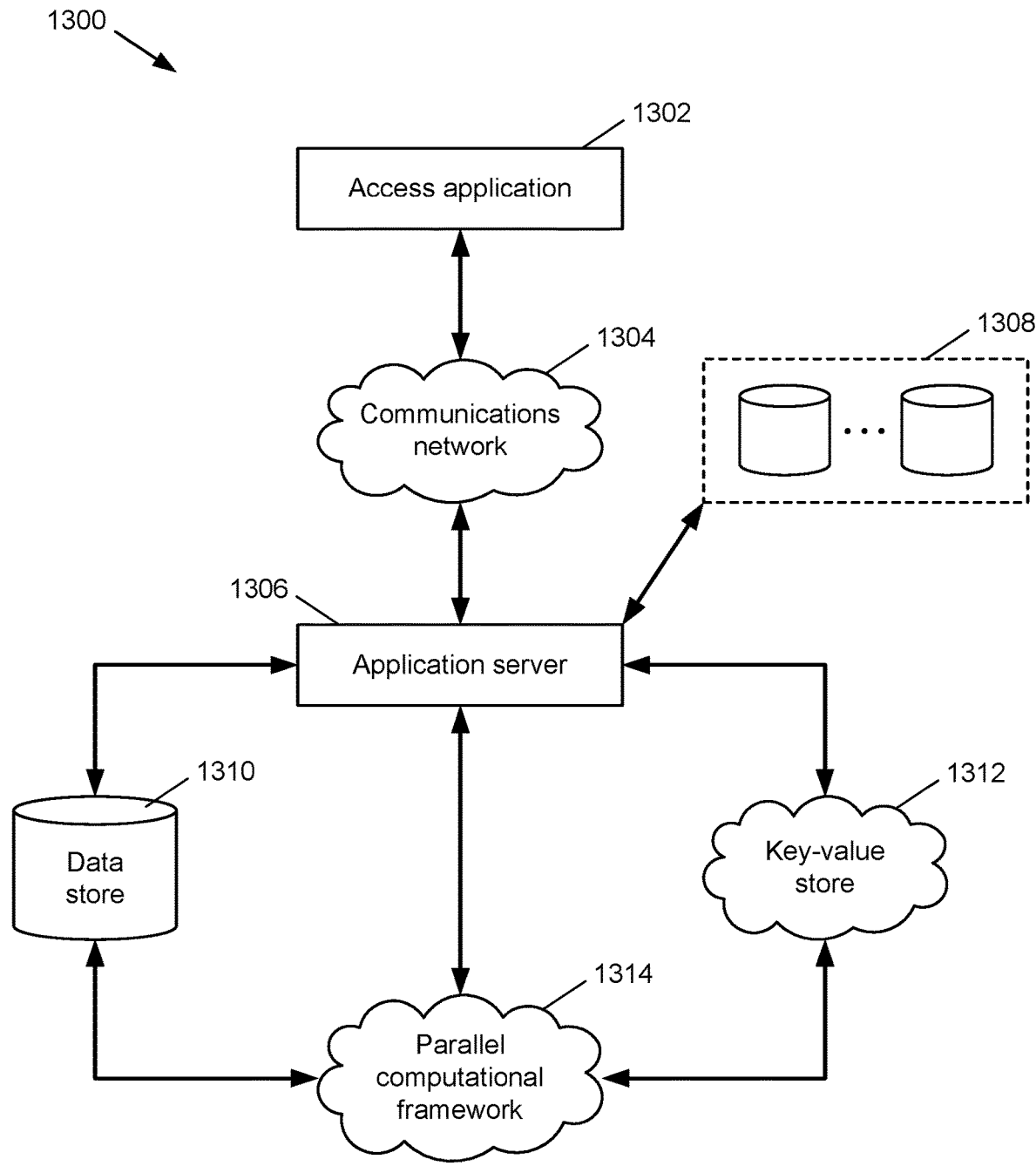
Figure 14:
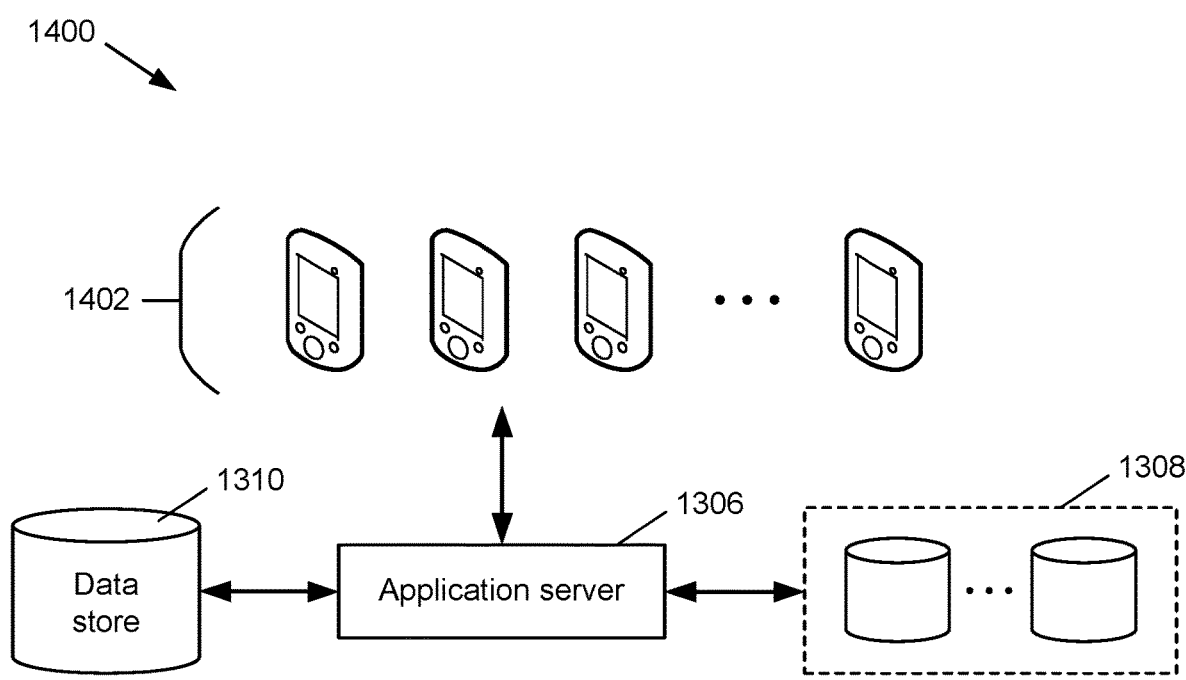

In order to provide additional context for various embodiments described herein, FIGS. 12-14 and the following discussion are intended to provide a brief, general description of a suitable computing environment in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, an example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). While the internal HDD 1214 is illustrated as located within the computer 1202, the internal HDD 1214 can also be configured for external use in a suitable chassis (not shown). The HDD 1214, magnetic FDD 1216 and optical disk drive 1220 can be connected to the system bus 1208 by an HDD interface 1224, a magnetic disk drive interface 1226 and an optical drive interface 1228, respectively. The interface 1224 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a USB port, an IR interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a single memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

FIG. 13 illustrates a block diagram of another aspect of an architecture 1300 that can be utilized to implement various embodiments of the present disclosure. A user may utilize access application 1302 to access application server 1306 over communication network 1304. For example, access application 1302 may include a computer application such as a standard web browser or an app running on a mobile device. Application server 1306 may comprise any suitable computer server, including a web server, and communication network 1306 may comprise any suitable network, such as the Internet. Access application 1302 may also include proprietary applications specifically developed for one or more platforms or devices. For example, access application 1302 may include one or more instances of an Apple iOS, Android, or WebOS application or any suitable application for use in accessing application server 1306 over communication network 1304. Multiple users may access application server 1306 via one or more instances of access application 1302. For example, a plurality of mobile devices may each have an instance of access application 1302 running locally on the respective devices. One or more users may use an instance of access application 1302 to interact with application server 1306.

Communication network 1304 may include any wired or wireless network, such as the Internet, WiMax, wide area cellular, or local area wireless network. Communication network 1304 may also include personal area networks, such as Bluetooth and infrared networks. Communications on communication network 1304 may be encrypted or otherwise secured using any suitable security or encryption protocol.

Application server 1306, which may include any network server or virtual server, such as a file or web server, may access data sources 1308 locally or over any suitable network connection. Application server 1306 may also include processing circuitry (e.g., one or more computer processors or microprocessors), memory, and one or more storage devices, as generally described above with respect to FIG. 12. The processing circuitry included in application server 1306 may execute a server process for identity determination and matching, while access application 1302 executes a corresponding client process. The access application 1302 may be executed by processing circuitry on a user's equipment, such as a computer or a mobile device (e.g., a cell phone, a wearable mobile device such as a smartwatch, etc.). The processing circuitry included in application server 1306 and/or the processing circuitry that executes access application 1302 may also perform any of the calculations and computations described herein in connection with identity determination and/or matching. In some embodiments, a computer-readable medium with computer program logic recorded thereon is included within application server 1306 in a similar manner to the computing environment 1200 shown in FIG. 12.

Application server 1306 may access data sources 1308 over the Internet, a secured private LAN, or any other communication network. Data sources 1308 may include one or more third-party data sources, such as data from third-party social networking services and third-party ratings bureaus, as described above. Data sources 1308 may also include data stores and databases local to application server 1306 containing, for instance, relationship information about users accessing application server 1306 via access application 1302.

Application server 1306 may be in communication with one or more of data store 1130, key-value store 1312, and parallel computational framework 1314. Data store 1310, which may include any relational database management system (RDBMS), file server, or storage system, may store information relating to one or more network communities. For example, the entity data structure 110 and/or other databased maintained in connection with embodiments described herein can be stored, wholly or in part, on data store 1310. Data store 1310 may store identity information about users and entities in the network community, an identification of the nodes in the network community, user link and path weights, user configuration settings, system configuration settings, and/or any other suitable information. There may be one instance of data store 1310 per network community, or data store 1310 may store information relating to a plural number of network communities. For example, data store 1310 may include one database per network community, or one database may store information about all available network communities (e.g., information about one network community per database table).

Parallel computational framework 1314, which may include any parallel or distributed computational framework or cluster, may be configured to divide computational jobs into smaller jobs to be performed simultaneously, in a distributed fashion, or both. For example, parallel computational framework 1314 may support data-intensive distributed applications by implementing a map/reduce computational paradigm where the applications may be divided into a plurality of small fragments of work, each of which may be executed or re-executed on any core processor in a cluster of cores. A suitable example of parallel computational framework 1314 includes an Apache Hadoop cluster.

Parallel computational framework 1314 may interface with key-value store 1312, which also may take the form of a cluster of cores. Key-value store 1312 may hold sets of key-value pairs for use with the map/reduce computational paradigm implemented by parallel computational framework 1314. For example, parallel computational framework 1314 may express a large distributed computation as a sequence of distributed operations on data sets of key-value pairs. User-defined map/reduce jobs may be executed across a plurality of nodes in the cluster. The processing and computations described herein may be performed, at least in part, by any type of processor or combination of processors. For example, various types of quantum processors (e.g., solid-state quantum processors and light-based quantum processors), artificial neural networks, and the like may be used to perform massively parallel computing and processing.

In some embodiments, parallel computational framework 1314 may support two distinct phases, a "map" phase and a "reduce" phase. The input to the computation may include a data set of key-value pairs stored at key-value store 1312. In the map phase, parallel computational framework 1314 may split, or divide, the input data set into a large number of fragments and assign each fragment to a map task. Parallel computational framework 1314 may also distribute the map tasks across the cluster of nodes on which it operates. Each map task may consume key-value pairs from its assigned fragment and produce a set of intermediate key-value pairs. For each input key-value pair, the map task may invoke a user-defined map function that transmutes the input into a different key-value pair. Following the map phase, parallel computational framework 1314 may sort the intermediate data set by key and produce a collection of tuples so that all the values associated with a particular key appear together. Parallel computational framework 1314 may also partition the collection of tuples into a number of fragments equal to the number of reduce tasks.

In the reduce phase, each reduce task may consume the fragment of tuples assigned to it. For each such tuple, the reduce task may invoke a user-defined reduce function that transmutes the tuple into an output key-value pair. Parallel computational framework 1314 may then distribute the many reduce tasks across the cluster of nodes and provide the appropriate fragment of intermediate data to each reduce task.

Tasks in each phase may be executed in a fault-tolerant manner, so that if one or more nodes fail during a computation the tasks assigned to such failed nodes may be redistributed across the remaining nodes. This behavior may allow for load balancing and for failed tasks to be re-executed with low runtime overhead.

Key-value store 1312 may implement any distributed file system capable of storing large files reliably. For example, key-value store 1312 may implement Hadoop's own distributed file system (DFS) or a more scalable column-oriented distributed database, such as HBase. Such file systems or databases may include BigTable-like capabilities, such as support for an arbitrary number of table columns.

Although FIG. 13, in order to not over-complicate the drawing, only shows a single instance of access application 1302, communication network 1304, application server 1306, data source 1308, data store 1310, key-value store 1312, and parallel computational framework 1314, in practice architecture 1300 may include multiple instances of one or more of the foregoing components. In addition, key-value store 1312 and parallel computational framework 1314 may also be removed, in some embodiments.

As further shown in architecture 1400 of FIG. 14, the parallel or distributed computations carried out by key-value store 1312 and/or parallel computational framework 1314 may be additionally or alternatively performed by a cluster of mobile devices 1402 instead of stationary cores. In some embodiments, cluster of mobile devices 1402, key-value store 1312, and parallel computational framework 1314 are all present in the network architecture. Certain application processes and computations may be performed by cluster of mobile devices 1402 and certain other application processes and computations may be performed by key-value store 1312 and parallel computational framework 1314. In addition, in some embodiments, communication network 1304 itself may perform some or all of the application processes and computations. For example, specially configured routers or satellites may include processing circuitry adapted to carry out some or all of the application processes and computations described herein.

Cluster of mobile devices 1402 may include one or more mobile devices, such as PDAs, cellular telephones, mobile computers, or any other mobile computing device. Cluster of mobile devices 1402 may also include any appliance (e.g., audio/video systems, microwaves, refrigerators, food processors) containing a microprocessor (e.g., with spare processing time), storage, or both. Application server 1306 may instruct devices within cluster of mobile devices 1402 to perform computation, storage, or both in a similar fashion as would have been distributed to multiple fixed cores by parallel computational framework 1314 and the map/reduce computational paradigm. Each device in cluster of mobile devices 1402 may perform a discrete computational job, storage job, or both. Application server 1306 may combine the results of each distributed job and return a final result of the computation.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method of managing data relating to an entity, the method comprising:
   identifying, by at least one device comprising a processor, an entity referenced by a plurality of input text sources;
   generating, by the at least one device, a first node record corresponding to the entity in a database;
   identifying a second entity referenced by one or more of the plurality of input text sources;
   generating a second node record in the database corresponding to the second entity;
   populating, by the at least one device, the first node record with first characteristics of the first entity extracted from at least one of the plurality of input text sources, wherein the first characteristics comprise connection characteristics regarding a social connection between the first entity and the second entity, employment information regarding the first entity, and one or more reliability scores regarding reliability of the input data;
   populating, by the at least one device, the second node record with first characteristics of the second entity extracted from at least one of the plurality of input text sources;
   calculating, by the at least one device, a numeric connection strength representative of a strength of the social connection between the first entity and the second entity taking into account at least one reliability score regarding reliability of the input data;
   generating a link record in the database corresponding to a connection between the first entity and the second entity;
   assigning, by the at least one device, the numeric connection strength to the link record, wherein the numeric connection strength is based upon the social connection between the first entity and the second entity;
   automatically comparing, by the at least one device, characteristics populated in the first node record with respective characteristics populated in a plurality of respective other node records of the database; and
   automatically merging, by the at least one device, the first node record with a third record in the database in response to a result of determining through the comparing that the first node record and the third node record both correspond to the first entity, resulting in a merged node record corresponding to the first entity.

2. The method of claim 1, further comprising:
   calculating, by the at least one device, respective identity probabilities for the plurality of respective other node records of the database s based on the comparing, the identity probabilities corresponding to probability of the entity corresponding to the first entity being a same entity as respective entities corresponding to the respective other node records of the database,
   wherein the merging comprises merging the first node record with one or more second node records in response to an identity probability for the one or more second node records being higher than a threshold.

3. The method of claim 2, wherein the merging further comprises including an identity probability for the second node record in the merged node record.

4. The method of claim 2, wherein the calculating comprises:
   assigning reliability scores to a plurality of respective characteristics populated in the first node record; and
   weighting the plurality of respective characteristics populated in the first record according to the reliability scores.

5. The method of claim 4, wherein the assigning comprises assigning the reliability scores based on one or more of an age of the plurality of input text sources, a reliability of the plurality of input text sources, frequency of a corresponding characteristic appearing in the plurality of input text sources, or a type of the corresponding characteristic.

6. The method of claim 1, wherein the comparing comprises:
   comparing at least one of the connection characteristics regarding a social connection populated in the first node record with at least one respective connection characteristic regarding a social connection populated in at least one of the plurality of respective other node records of the database; and
   comparing the numeric connection strength with at least one corresponding numeric connection strength populated in at least one of the plurality of respective other node records of the database.

7. The method of claim 1, wherein the computing a connection strength of a social connection comprises computing the connection strength based on at least one of length of the social connection, mutual connection between parties to the social connection, nature of interactions between the parties to the social connection, or frequency of the social connection being referenced in the input text source.

8. The method of claim 1, wherein:
   the first entity is a person, and
   the characteristics of the first entity comprise at least one of biographical information, employment information, or family information.

9. The method of claim 1, wherein:
   The first entity is an organization, and
   the characteristics of the first entity comprise at least one of operating information, business information, membership information, or characteristics of one or more members of the organization.

10. The method of claim 1, wherein the merging comprises:
    updating the second node record with one or more characteristics from the first node record, and discarding the first node record.

11. A system, comprising:
    a database comprising a plurality of records corresponding to respective entities, wherein respective ones of the records are populated with characteristics of a respectively corresponding entity;
    at least one processor; and
    a memory that stores processor-executable instructions, wherein the instructions, when executed by the at least one processor, cause the at least one processor to perform operations comprising:
      identifying a first entity referenced by a plurality of input text sources;
      generating a first node record in the database corresponding to the first entity;
      identifying a second entity referenced by one or more of the plurality of input text sources;
      generating a second node record in the database corresponding to the second entity;
      populating the first node record with first characteristics of the first entity extracted from at least one of the plurality of input text sources, wherein the first characteristics comprise connection characteristics regarding a social connection between the first entity and the second entity, employment information regarding the first entity, and one or more reliability scores regarding reliability of the input data;

populating the second node record with first characteristics of the second entity extracted from at least one of the plurality of input text sources;
calculating a numeric connection strength representative of a strength of the social connection between the first entity and the second entity taking into account at least one reliability score regarding reliability of the input data;
generating a link record in the database corresponding to a connection between the first entity and the second entity;
assigning a numeric connection strength to the link record, wherein the numeric connection strength is based upon the social connection between the first entity and the second entity;
comparing characteristics populated in the first node record with respective characteristics populated in respective other node records of the database; and
merging the first node record with a third node record in the database in response to a result of determining through the comparing that the first node record and the third node record both correspond to the first entity, resulting in a merged node record corresponding to the first entity.

12. The system of claim 11, wherein the operations further comprise:
calculating respective identity probabilities for the respective other node records of the database based on the comparing, the identity probabilities corresponding to probability of the first entity being a same entity as respective entities corresponding to the respective other node records of the database; and
merging the first node record with one or more second node records in response to an identity probability for the one or more second node records being higher than a threshold.

13. The system of claim 11, wherein the operations further comprise:
assigning reliability scores to a plurality of respective characteristics populated in the first record; and
weighting the plurality of respective characteristics populated in the first node record according to the reliability scores.

14. The system of claim 11, wherein the operations further comprise:
comparing the characteristics populated in the first node record with the respective characteristics populated in the respective other node records of the database at least in part by comparing the respective social connection and corresponding connection strength populated in the first node record with respective social connection and corresponding connection strength populated in the respective other node records of the database.

15. The system of claim 11, wherein the operations further comprise:
computing the connection strength of a social connection based on at least one of length of the social connection, mutual connections between parties to the social connection, nature of interactions between the parties to the social connection, or frequency of the social connection being referenced in the input text source.

16. A non-transitory computer-readable medium comprising processor-executable instructions which, when executed by at least one processor, facilitate performance of operations, the operations comprising:
identifying a first entity referenced by at least one of a plurality of input data sources;
generating a first node record corresponding to the first entity in a database comprising a plurality of records;
identifying a second entity referenced by one or more of the plurality of input text sources;
generating a second node record in the database corresponding to the second entity;
populating, by the at least one device, the first node record with first characteristics of the entity extracted from at least one of the plurality of input text sources, wherein the first characteristics comprise connection characteristics regarding a social connection between the first entity and the second entity, employment information regarding the first entity, and one or more reliability scores regarding reliability of the input data;
populating the second node record with first characteristics of the second entity extracted from at least one of the plurality of input text sources;
calculating a numeric connection strength representative of a strength of the social connection between the first entity and the second entity taking into account at least one reliability score regarding reliability of the input data;
generating a link record in the database corresponding to a connection between the first entity and the second entity;
assigning a numeric connection strength to the link record, wherein the numeric connection strength is based upon the social connection between the first entity and the second entity;
comparing, by the at least one device, characteristics populated in the first node record with respective characteristics populated in respective other node records of the database; and
merging the first node record with a third node record in the database in response to a result determining through the comparing that the first node record and the third node record both correspond to the first entity, resulting in a merged node record corresponding to the first entity.

17. The non-transitory computer-readable medium of claim 16, wherein the operations further comprise:
calculating respective identity probabilities for the respective other node records of the database based on the comparing, the identity probabilities corresponding to probability of the first entity being a same entity as respective entities corresponding to the respective other node records of the database; and
merging the first node record with one or more second node records in response to an identity probability for the one or more second node records being higher than a threshold.

18. The non-transitory computer-readable medium of claim 16, wherein the operations further comprise:
assigning reliability scores to a plurality of respective characteristics populated in the first record; and
weighting the plurality of respective characteristics populated in the first record according to the reliability scores.

19. The non-transitory computer-readable medium of claim 16, wherein the operations further comprise:
comparing the characteristics populated in the first node record with the respective characteristics populated in the respective other node records of the database at least in part by comparing the respective social connection and corresponding connection strength populated in the first node record with respective social connection and corresponding connection strength populated in the respective other node records of the database.

* * * * *